(12) United States Patent
Taniguchi

(10) Patent No.: US 6,496,518 B1
(45) Date of Patent: Dec. 17, 2002

(54) SDH TRANSMISSION SYSTEM, AND FRAME TRANSMISSION METHOD IN SDH TRANSMISSION SYSTEM AND SDH TRANSMISSION UNIT

(75) Inventor: Atsuki Taniguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/119,265

(22) Filed: Jul. 20, 1998

(30) Foreign Application Priority Data

Jan. 28, 1998 (JP) .......................................... 10-016008

(51) Int. Cl.$^7$ ................................................ H04J 3/12
(52) U.S. Cl. ...................................... 370/465; 370/528
(58) Field of Search ................................ 370/389, 395, 370/465, 474, 353, 227, 228, 468, 528, 476, 477, 406

(56) References Cited

U.S. PATENT DOCUMENTS

| | | | |
|---|---|---|---|
| 5,103,447 A | | 4/1992 | Takiyasu et al. |
| 5,214,643 A | | 5/1993 | Mueller et al. |
| 5,315,594 A | * | 5/1994 | Noser .......................... 370/353 |
| 5,341,376 A | * | 8/1994 | Yamashita .................. 370/466 |
| 5,365,518 A | * | 11/1994 | Noser .......................... 370/395 |
| 5,490,142 A | * | 2/1996 | Hurlocker ................... 370/465 |
| 6,181,675 B1 | * | 1/2001 | Miyamoto ................... 370/218 |
| 6,256,292 B1 | * | 7/2001 | Ellis et al. ................... 370/227 |
| 6,266,169 B1 | * | 7/2001 | Tomooka et al. ........... 359/134 |
| 6,314,097 B1 | * | 11/2001 | Ohara ......................... 370/392 |

FOREIGN PATENT DOCUMENTS

| | | |
|---|---|---|
| JP | 8181352 | 10/1983 |
| JP | 4290019 | 10/1992 |
| JP | 5244187 | 9/1993 |
| JP | 6120963 | 4/1994 |
| WO | 94/03001 | 2/1994 |
| WO | 96/33563 | 10/1996 |
| WO | 98/04072 | 1/1998 |

* cited by examiner

Primary Examiner—Min Jung
(74) Attorney, Agent, or Firm—Katten, Muchin, Zavis, Rosenman

(57) ABSTRACT

The present invention relates to an SDH transmission technique. In an SDH transmission system including a plurality of SDH transmission units for multiplex relay and one SDH transmission unit for relay, with a desired network formed by the respective SDH transmission units, the SDH transmission system is provided with a relay section for a communication carried out between the SDH transmission unit and the SDH transmission unit, or between the SDH transmission units, a multiplexing section for a communication carried out between the transmission units, and a network section for a desired communication carried out irrespective of the multiplexing section and the relay section in the above network. It is thereby possible to freely carry out a desired communication in the network irrespective of the relay section and the multiplexing section which are defined in an SDH transmission mode.

39 Claims, 17 Drawing Sheets

SDH TRANSMISSION SYSTEM, AND FRAME TRANSMISSION METHOD IN SDH TRANSMISSION SYSTEM AND SDH TRANSMISSION UNIT

BACKGROUND OF THE INVENTION (1) Field of the Invention

The present invention relates to an SDH (Synchronous Digital Hierarchy) transmission system, and a frame transmission method in an SDH transmission system and an SDH transmission unit, and more particularly to a transmission method suitable for use in a SONET in accordance with an SDH transmission mode.

(2) Description of the Related Art (A) Description of Transmission Frame Handled in SONET (SDH) Transmission Mode FIG. 9 is a diagram showing a format of a basic transmission frame handled in a SONET (Synchronous Optical Network). As shown in FIG. 9, the basic transmission frame for the SONET has 9×3 bytes of overhead 10 containing various operation and maintenance (supervisory control) information such as frame synchronization signal, or parity check signal, and 9×87 bytes of payload 20 containing actually transmitted data, resulting in information of 9×90 bytes in total. In the SONET, the 90×9 bytes (=810 bytes) of frame is transmitted 8000 times per second, thereby generating a signal [referred to as STS-1 (Synchronous Transport Signal Level 1), or STM-0 (Synchronous Transfer Module Level 0) in the SDH] having a transmission rate of 51.84M (=90×9×8×8000) b/s. As used herein, "SONET" means a network currently used in North America in accordance with an SDH transmission mode.

Further, as is well known, the overhead 10 is provided with a section overhead [(R-) SOH] 11 which, in communication between a line terminal multiplex relay transmission unit (LTE) and a regenerator unit (REG), or between the regenerator units (REG) (referred to as "section" in the SONET, or "regenerator (R-) section" in the SDH: see reference numeral 11A in FIG. 13), is terminated and replaced at the LTE and the REG, and a line overhead [LOH (M-SOH)] 12 which, in communication between the LTE (referred to as "line" in the SONET, or "multiplex (M-) section" in the SDH: see reference numeral 12A in FIG. 13), is terminated and replaced at the pieces of LTE.

Additionally, the overhead 10 is provided with the various operation and maintenance information. For example, as shown in FIG. 10, in the SOH 11 are defined A1, A2 bytes used to establish frame synchronization, a digital error supervising [BIP (Bit Interleaved Parity] byte B1 used on the section 11A, and data communication channel (DCC) bytes D1 to D3 (data link of 192 k b/s) for communication for a supervisory control in the section 11A. In the LOH 12 are defined a BIP byte B2 over a line 12A, APS (Automatic Protection Switch) bytes K1, K2, and DCC bytes D4 to D12 (data link of 576 k b/s) over the line 12A.

Moreover, in FIGS. 9 and 10, pointer bytes (AU [administrative unit] pointer) 13 shows, by using an address, a difference between a phase of a transmission frame and a frame phase of an administrative data unit (VT: Virtual Tributary Unit) contained in the payload 20. The pointer bytes 13 can rapidly establish frame synchronization of the VT.

Further, in the SONET, the basic transmission frame (STS-1) having the above-mentioned format is processed through byte multiplexing by n frames (where n=3, 12, 48, 192, and so forth), thereby forming an STS-n frame as shown in FIG. 11. It is possible to generate a high-speed signal with, for example, an STS-3 (of 155.52M b/s=51.84M b/s×3) if the STS-1 frame is processed through the byte multiplexing by 3 frames, an STS-12 (of 622.08 M b/s) if processed through the byte multiplexing by 12 frames, an STS-48 (of 2.488 G b/s) if processed through the byte multiplexing by 48 frames, and an STS-192 (of 9.953 G b/s) if processed through the byte multiplexing by 192 frames. Moreover, in the SDH, STM-N (N=n/3) respectively correspond to signals having the same transmission rates as those of the above STS-n.

Here, in the case of the STS-192, as shown in FIG. 12, the frame includes 9×576 (3×192) bytes of overhead 10 and 9×16704 (87×192) bytes of payload 20. However, all the bytes of the overhead 10 are not used. As shown in FIG. 12, only one byte is used for each area for operation and maintenance information (such as B1, E1, and F1) except special signals (such as A1, A2 bytes, and BIP byte B2). Hence, under the present circumstances, almost the entire area of the overhead 10 is left free.

(B) Description of SONET

FIG. 14 is a block diagram showing an illustrative SONET (transmission system). In the SONET 100 shown in FIG. 14, a 10 G ring network 200 for handling a transmission frame (STS-192) of about 10 G b/s, 2.4 G ring networks 300, 400 for handling a transmission frame (STS-48) of about 2.4 G b/s, and a 622 M ring network 500 for handling a transmission frame (STS-12) of about 622 M b/s are interconnected through transmission units serving as gateways which will respectively be described infra.

Further, as shown in FIG. 14, for example, in the 10 G ring network 200 (hereinafter briefly referred to as 10 G ring 200), a plurality of 10 G b/s line terminal multiplex relay transmission units (LTE) 110-1 to 110-4 and a plurality of 10 G b/s regenerator units (REG) 111 are connected in a ring manner. Similarly, in the 2.4 G ring networks 300, 400 (hereinafter briefly referred to as 2.4 G rings 300, 400), 2.4 G b/s LTE 120-1 to 120-4, and 130-1 to 130-4 are connected in the ring manner. In the 622M ring network 500 (hereinafter briefly referred to as 622M ring 500), 622M b/s LTE 140-1 to 140-4 are connected in the ring manner.

Moreover, in the 10 G ring network 200, according to a maximum transmittable distance of the line terminal multiplex relay transmission unit 110-*i* (where i=1 to 4), a proper number of regenerator units (REG) 111 are mounted between the line terminal multiplex relay transmission units 110-*i* to form the section 11A. It is to be noted that the regenerator unit 111 may be mounted in the 2.4 G rings 300, 400, or in the 622M ring 500.

Here, the transmission units (LTE) 110-*i*, 120-*i*, 130-*i*, and 140-*i*, and the transmission units 111 [hereinafter referred to as "transmission unit 100A" or "node unit 100A" unless the transmission units 110-*i*, 120-*i*, 130-*i*, 140-*i*, and 111 (LTE, REG) are individually shown] forming the rings 200 to 500 respectively have the function of performing replacement (termination/insertion) processing of the overhead 10 of the received transmission frame STS-n (STM-N). With attention to the function, as shown in FIG. 15, the transmission unit includes interface portions 171 to 173 according to a transmission frame to be handled (a speed of an accommodated line), a HUB circuit portion 174, a HED circuit portion 175, optical fibers 176, a CPU circuit portion 177, and so forth.

Further, each of the above interface portions 171 to 173 terminates a corresponding optical signal frame among, for example, an OC-192 (Optical Carrier-level 192) serving as an optical signal frame of the STS-192, an OC-48 serving as an optical signal frame of the STS-48, and an OC-12 serving as an optical signal frame of the STS-12, and extracts OH information in the overhead 10 to output the OH information to the HUB circuit portion 174, while inserting (storing) the OH information output from the HUB circuit portion 174 in the overhead 10 at a predetermined position.

However, the overhead 10 serving as a candidate for the termination/insertion processing varies depending upon whether it is processed in the interface portions 171 to 173 in the LTE 110-i, 120-i, 130-i, and 140-i, or in those in the REG 111. That is, both the SOH 11 and the LOH 12 are terminated in each of the LTE 110-i, 120-i, 130-i, and 140-i, and only the SOH 11 is terminated in each of the REG 111.

Moreover, all the interface portions 171 to 173 are not always used. For example, in the REG 111 shown in FIG. 14, the only type of interface portion, i.e., the interface portion 171 for the OC-192 is used.

Further, the HUB circuit portion 174 feeds the OH information from the interface portions 171 to 173 to the CPU circuit portion 177 through the HED circuit portion 175, while feeding to the corresponding interface portions 171 to 173 the OH information fed from the CPU circuit through the HED circuit portion 175. Here, the optical fibers 176 are used for connection with the HED circuit portion 175. It is thereby possible to perform high-speed OH information transmission processing between the HUB circuit portion 174 and the HED circuit portion 175 by using an ATM (Asynchronous Transfer Mode) cell-based optical signal.

Hence, as shown in FIG. 15, the HUB circuit portion 174 has a HUB portion 174A having the function of ATM cell generating (splitting)/multiplexing of the OH information from the interface portions 171 to 173, and an optical repeating regenerator (OR/OS: Optical Receiver/Optical Sender) 174B functioning as an electro/optical interface with the optical fibers 176.

Further, the above HED circuit portion 175 outputs to the CPU circuit portion 177 OH information input as an ATM cell through the optical fiber 176, while splitting into ATM cells and outputting to the HUB circuit portion 174 through the optical fiber 176 the OH information generated in the CPU circuit portion 175. For this purpose, the HED circuit portion includes an optical repeating regenerator (OS/OR) 175B functioning as an electro/optical interface with the optical fiber 176, and an overhead matrix portion 175B to make a routing control such that the ATM cell (OH information) from the HUB circuit portion 174 can be output to any one of a plurality of SCC (Serial Communication Channel) ports 178 of the CPU circuit portion 177. Moreover, the overhead matrix portion 175B also has the function of splitting into ATM cells the OH information generated in the CPU circuit portion 177.

Further, the CPU circuit portion 177 analyzes the OH information fed from the HED circuit portion 175, and generates OH information to be transmitted after being inserted in an overhead 10 of a transmission frame sent to an additional transmission unit 110, thereby making a supervisory control of the system 100. In the CPU circuit portion 177, the plurality of SCC ports 178 are connected to a CPU 180 through a bus 179.

According to the above configuration, in the above SONET transmission network 100, the termination/insertion processing of the overhead 10 is performed through the CPU 180 for each of the transmission units 100A, thus appropriately performing the transmission processing of the supervisory control information for the transmission network 100. This enables a network control unit 150 (see FIG. 14) to make a centralized supervisory control (such as construction of a communication path, or a network control (in operation) after the communication path construction) of the transmission network 100.

Specifically, the centralized supervisory control is typically made by communication between the CPUs 180 of the respective node units 100A by using the above D1 to D3 bytes or the D4 to D12 bytes for the DCC in the overhead 10.

Here, the communication path for communication is automatically constructed (set) by the network control unit 150 when, for example, the node unit 100A is turned on. That is, the network control unit 150 instructs, by using the DCC, one node unit 100A to set the communication path. The CPU 180 of the node unit 100A receives the instruction, and automatically and concurrently calls the CPUs 180 of all the other node units 100A by using the DCC [see FIG. 16(a)].

Further, the network control unit 150 determines a path (route) used for an actual communication (supervisory control) depending upon directions in which answers come back from the node units, and identification information (node ID) of the respective node units 10A, set to the answers [see FIG. 16(b)].

This enables the network control unit 150 to automatically set the communication (supervisory control) path irrespective of a network configuration. Moreover, when answers from the same node unit 100A come back from a plurality of directions, the network control unit 150 sets the path in a direction from which the first answer comes back.

Further, after setting the path as described above, the network control unit 150 communicates with the CPU 180 of a desired node unit 100A by using the DCC (through the set path), thereby making the centralized supervisory control of the transmission network 100 (for example, canceling an alarm generated in one node unit 100A). Moreover, after the communication path is set, the communication path may become unavailable due to, for example, a line trouble. In such a case, the network control unit 150 reconstructs a communication path as in the above discussion after the elapse of a desired time period (after, for example, about ten minutes).

However, in the system 100 using such a DCC, the centralized supervisory control requires a significantly complex protocol. Thus, it becomes difficult under the present circumstances to continuously obtain a stable operation. For example, when a large amount of alarms are given in one node unit 100A at the same time, the load on the CPU 180 of the node unit 100A rapidly increases, and a system down may be caused.

Further, when the communication path become unavailable due to a failure of the node unit 100A on the communication path in use, the line trouble, and so forth, the communication path can not be restored before, for example, the elapse of ten minutes as described above. Consequently, the restoration of the communication path takes a long time, resulting in a problem of reduced reliability of the centralized supervisory control.

Further, in the above system 100, a normal communication can be carried out with networks 160A, 160B (see FIG. 14) of other companies (other makers) since a recommendation provides a part concerning transmission of main signal, such as the frame synchronization establishment, parity operation, and handling of the payload 20. However, the companies have their own specifications for specifying another part concerning the communication between the CPUs 180, such as DCC. For example, in some cases, supervisory control information in the network 160A, 160B of the other companies can not directly pass through the 10 G ring 200.

Hence, in recent years, in the network (10 G ring 200) providing lines additionally connected to the network 160A, 160B of the other companies as shown in FIG. 14, it has been desired to perform no processing for supervisory control information other than own supervisory control information, and transparently pass the information to the other companies' networks 160A, 160B (see FIG. 17).

In order to realize such a transparent transmission, there is one possible method in that a special byte for the purpose is additionally prepared (defined) in a space area (undefined byte) of the overhead 10, and the supervisory control information in the other companies' networks 160A, 160B are set thereto (inserted therein).

However, the additional definition of the special byte causes a complicated control (handling) of the termination/insertion processing in the respective node units 100A, resulting in, for example, excessive load on hardware (mainly on the above interface portions 171 to 173), or an increase in hardware scale itself. Further, it becomes very difficult to control, for example, between which node unit 100A and which node unit 100A a certain byte should be transmitted.

In addition, in the system 100 of the same maker, though clock synchronization can basically be maintained at a time of termination/insertion of the overhead 10 in the node unit 100A, there may generally be left a slight difference. Consequently, little guarantee can be given that complete clock synchronization can be maintained when connected to the other companies' networks 160A, 160B. Hence, when passing the supervisory control information received from the other companies' networks 160A, 160B, data slip (loss or rereading) may occur in the node unit 100A due to a slight difference in clock.

That is, in the conventional system 100, the OH information of the overhead 10 is terminated in the respective node units 100A forming the section 11A or the line 12A, thereby continuously carrying out the communication about the supervisory control information through the CPUs 180 of the respective node units 100A. Hence, it is impossible to carry out a free communication for a supervisory control irrespective of the section 11A and the line 12A in the system 100. As a result, there are caused phenomena in that, for example, a stable supervisory control can not be made due to a rapid variation in load on the CPU 180, and OH information in conformance with specifications different from those of the own network can not be transmitted.

SUMMARY OF THE INVENTION

In view of the foregoing problems, it is an object of the present invention to provide an SDH transmission system, a frame transmission method in an SDH transmission system and an SDH transmission unit in which a desired communication can freely be carried out in a network irrespective of a relay section and a multiplexing section defined in an SDH transmission mode.

According to the present invention, for achieving the above-mentioned object, there is provided an SDH transmission system including a plurality of SDH transmission units for multiplex relay to carry out a multiplex relay transmission of a transmission frame in an SDH transmission mode, and at least one SDH transmission unit for relay to carry out a relay transmission of the transmission frame between the SDH transmission units for multiplex relay, with a desired network formed by the plurality of SDH transmission units. Further, the SDH transmission system is provided with a relay section for a communication carried out by transmitting the transmission frame between the SDH transmission unit for multiplex relay and the SDH transmission unit for relay, or between the SDH transmission units for relay, a multiplexing section for a communication carried out by transmitting the transmission frame between the SDH transmission units for multiplex relay, and a network section for a desired communication carried out irrespective of the multiplexing section and the relay section in the network.

Therefore, it is possible to carry out a free communication in the network without much concern for the multiplexing section and the relay section, thereby providing the following advantages:

(1) It is possible to reduce the load of communication processing in the SDH transmission unit so as to stabilize the communication in the entire system.

(2) It is possible to make a normal connection through the network section to a network having specifications different from those of communication processing in the own network.

Here, in the SDH transmission system, an area for asynchronous communication may be reserved on an overhead portion of the above transmission frame, thereby carrying out the asynchronous communication in the above network section.

It is thereby possible to normally carry out the communication in the network without much concern for a clock of the transmission frame, resulting in a more simplified and higher-speed communication control in the network section.

Further, in the SDH transmission system, the area for asynchronous communication may be reserved on, in the above overhead portion, an overhead portion for a multiplexing section terminated in the SDH transmission unit for multiplex relay, thereby carrying out the asynchronous communication between the SDH transmission units for multiplex relay in the network section.

Further, in the SDH transmission system, the area for asynchronous communication may be reserved on, in the above overhead portion, at least an overhead portion for a relay section terminated in the SDH transmission unit for relay, thereby carrying out the asynchronous communication through the SDH transmission unit for multiplex relay and the SDH transmission unit for relay in the above network section.

It is thereby possible to carry out a communication with the desired SDH transmission unit for multiplex relay or relay in the network section, resulting in a contribution to flexibility of the communication in the network section.

Besides, in the SDH transmission system, an asynchronous communication cell having a communication control information portion and a data portion may be inserted in the above area for asynchronous communication, and the above SDH transmission unit may be provided with an asynchronous communication control portion capable of transmitting the asynchronous communication cell to the additional SDH transmission unit for multiplexing relay depending upon the communication control information portion of the asynchronous communication cell.

In the SDH transmission system, in the network section, the asynchronous communication cell is transmitted to the desired SDH transmission unit depending upon the communication control information portion thereof. Consequently, an extremely easy control can realize a high-speed communication in the network section. Additionally, it is possible to control a transmission destination (that is, a communication partner) of the above cell by simply controlling only the above communication control information portion, resulting in a very simplified control of the transmission destination.

Moreover, the communication in the network section may be made redundant. Thereby, it is possible to normally continue the communication in the network section even when the communication in the partial network section becomes unavailable due to occurrence of a failure or the like, resulting in significantly enhanced reliability of the system.

In this case, for example, two communication routes may be set in the above network section to carry out a communication by using, when one of the communication routes becomes unavailable, the other communication route. It is possible to extremely easily realize redundancy of the above network section.

Further, in the SDH transmission system, the above SDH transmission units may be connected in a ring manner to form a ring network as the above network, and communication routes respectively extending to the right and the left with respect to the above ring network may be set as the above two communication routes in the network section of the ring network. Thereby, it is also possible to extremely easily realize redundancy of the network section in the ring network.

Moreover, when any one of the above communication routes respectively extending to the right and the left is previously set to an unavailable state, only any one of the communication routes is used. Consequently, in the SDH transmission unit to terminate the communication routes, it is unnecessary to select the communication route, and continuously supervise in which of the communication routes the trouble occurs. Thus, it is possible to simplify, at least, the SDH transmission unit to terminate the communication routes.

Further, in this case, when the communication route different from the communication route set to the unavailable state becomes unavailable, the communication route set to the unavailable state may be set to an available state. In this case, it is also possible to normally continue the communication in the network section, resulting in significantly enhanced reliability of the system.

Besides, in the communication control information portion of the asynchronous communication cell may be set at least identification information of an SDH transmission unit serving as a transmission destination of the asynchronous communication cell. The above cell can thereby be transmitted to pass through intermediate SDH transmission units (a relay section, a multiplexing section) until the cell reaches the corresponding transmission unit in the network section. As a result, it is possible to extremely easily realize an asynchronous communication with a desired SDH transmission unit in the network section.

Moreover, in the communication control information portion of the asynchronous communication cell may be set both identification information of an SDH transmission unit serving as a transmission destination of the asynchronous communication cell, and identification information of an SDH transmission unit serving as a source of the asynchronous communication cell. In this case, the above SDH transmission unit serving as the transmission destination can identify that signals, even with the same transmission destination identification information, respectively contain different data as long as source identification information are different. As a result, even when signals with the same transmission destination identification information are transmitted from a plurality of transmission units, it is possible to continuously carry out a normal communication.

Besides, when two communication routes are set in the network section of the ring network, in the communication control information of the above asynchronous communication cell may be set identification information of the SDH transmission unit serving as a transmission destination of the asynchronous communication cell, identification information of the SDH transmission unit serving as a source of the asynchronous communication cell, and flag information used to identify through which of the respective communication routes the asynchronous communication cell is transmitted. Even when the respective communication routes are multiplexed in one SDH transmission unit, the communication route of the asynchronous communication cell can be identified depending upon the flag information. As a result, it is possible to surely perform selection of the communication route.

Further, when in the communication control information of a received asynchronous communication cell is set own identification information as the above identification information of the SDH transmission unit serving as the source, the above SDH transmission unit may discard the asynchronous communication cell. It is thereby possible to avoid a phenomenon in that, for example, a cell has no fixed destination by erroneously setting identification information which can not be found in the network section, and is left unerased indefinitely in the network, resulting in more enhanced reliability of the system.

Besides, as long as a received asynchronous communication cell can be transmitted to a network other than the above network, the above SDH transmission unit for multiplex relay can transmit the received asynchronous communication cell to the additional network as required. Thus, the above asynchronous communication can be applied to any type of network topology.

Next, in an SDH transmission system to transmit a transmission frame in an SDH transmission mode, a frame transmission method in the SDH transmission mode of the present invention includes the steps of inserting an asynchronous communication cell in a space area of an overhead portion of the transmission frame, and transmitting the transmission frame.

Thus, according to a frame transmission method in the SDH transmission mode of the present invention, it is possible to provide the following advantages:

(1) It is possible to make a supervisory control of the SDH transmission system by using the asynchronous communication, reduce the load of communication processing for the supervisory control, and make the above communication processing higher.

(2) Since the space area of the overhead portion is not fixedly used, it is possible to considerably enhance versatility and expandability of the communication processing for the above supervisory control.

(3) Since the asynchronous communication cell enables asynchronous transmission for the supervisory control without much concern for a clock of the transmission frame, resulting in an extremely easy communication control.

(4) It is possible to apply the existing asynchronous communication technique, resulting in very high practicability.

In addition, an SDH transmission unit of the present invention transmits a transmission frame in an SDH transmission mode. The SDH transmission unit includes a first overhead information extracting portion to extract first overhead information inserted in a space area of an overhead portion of a received transmission frame, a second overhead information extracting portion to extract second overhead information set in an area other than the above space area of the overhead portion, a main communication control portion to perform desired communication processing about the SDH transmission system depending upon the second overhead information extracted in the second overhead information extracting portion, an overhead inserting portion to insert a result of processing in the main communication control portion as an overhead portion of a transmission frame for an additional SDH transmission unit, and a distribution control portion to distribute to the overhead inserting portion at least first overhead information other than self-addressed information among the first overhead information extracted in the above first overhead information extracting portion so as to insert in a space area of the overhead portion for the additional SDH transmission unit.

Thus, according to the SDH transmission unit of the present invention, it is possible to provide the following advantages:

(1) Since the first overhead information other than the self-addressed information is transmitted after being inserted in the space area of the overhead portion of the transmission frame for the additional SDH transmission unit, it is possible to reduce the load of communication processing for the supervisory control.

(2) Since the space area of the overhead portion is not fixedly used, it is possible to considerably enhance versatility and expandability of the communication processing for the above supervisory control.

Here, the above first overhead information extracting portion may be configured as an asynchronous communication cell extracting portion to extract an asynchronous communication cell having a communication control information portion and a communication data portion, and the above distribution control portion may be configured as an asynchronous communication control portion to perform the above distribution processing depending upon communication control information set in the communication control information portion of the above asynchronous communication cell.

In this case, according to the SDH transmission unit, it is possible to provide the following advantages:

(1) The above communication processing can be made higher.

(2) Since the asynchronous communication cell enables asynchronous transmission for the supervisory control without much concern for a clock of the transmission frame, resulting in an extremely easy communication control.

(3) It is possible to apply the existing asynchronous communication technique, resulting in very high practicability.

Here, the above asynchronous communication control portion may include a switching mechanism portion to output, when communication control information of the received asynchronous communication cell is self-addressed information, the asynchronous communication cell to the above main communication processing portion, while outputting, when the communication control information of the received asynchronous communication cell is information other than the self-addressed information, the asynchronous communication cell to the above overhead inserting portion. It is thereby possible to realize the above distribution function in a simplified configuration.

Further, the above asynchronous communication control portion may include an asynchronous communication cell generating portion to generate an asynchronous communication cell addressed to an additional SDH transmission unit. In this case, the above switching mechanism portion may be set to output to the above overhead inserting portion the asynchronous communication cell generated in the asynchronous communication cell generating portion so as to insert in a space area of the overhead portion for the additional SDH transmission unit. It is thereby possible to transmit with a simple setting at a high speed a cell which needs to be posted to the additional SDH transmission unit.

Besides, the above asynchronous communication cell generating portion may set in the communication control information portion of the above asynchronous communication cell identification information of the additional SDH transmission unit serving as a transmission destination of the asynchronous communication cell. The above cell can thereby be transmitted to pass through intermediate SDH transmission units until the cell reaches the corresponding transmission unit. As a result, it is possible to extremely easily realize an asynchronous communication with the SDH transmission unit.

Further, the asynchronous communication cell generating portion may set in the communication control information portion of the above asynchronous communication cell both identification information of the additional SDH transmission unit serving as a transmission destination of the asynchronous communication cell, and own identification information. The SDH transmission unit serving as the transmission destination can identify that signals (cells), even with the same transmission destination identification information, respectively contain different data as long as source identification information are different. As a result, even when cells with the same transmission destination identification information are transmitted from a plurality of transmission units, it is possible to continuously carry out a normal communication.

Further, the above switching mechanism portion may discard, when own identification information is set in a communication control information portion of an asynchronous communication cell received from an additional SDH transmission unit, the asynchronous communication cell. It is thereby possible to avoid a phenomenon in that, for example, a cell has no fixed destination by erroneously setting identification information of an SDH transmission unit which does not exist, and is left unerased indefinitely in the network, thus greatly contributing to enhancement of reliability of the SDH system.

In addition, the switching mechanism portion may transmit, when in the communication control information portion of the above asynchronous communication cell is set transmission instruction information showing as a destination an SDH transmission unit in an additional SDH transmission system, the asynchronous communication cell to the SDH transmission unit in the additional SDH transmission system. Since it is thereby possible to transmit the received asynchronous communication cell to the additional network as required, the asynchronous communication can flexibly be applied to any type of network topology.

DESCRIPTION OF THE PREFERRED EMBODIMENTS

A description will now be given of an embodiment of the present invention referring to the accompanying drawings.

Figure 1:
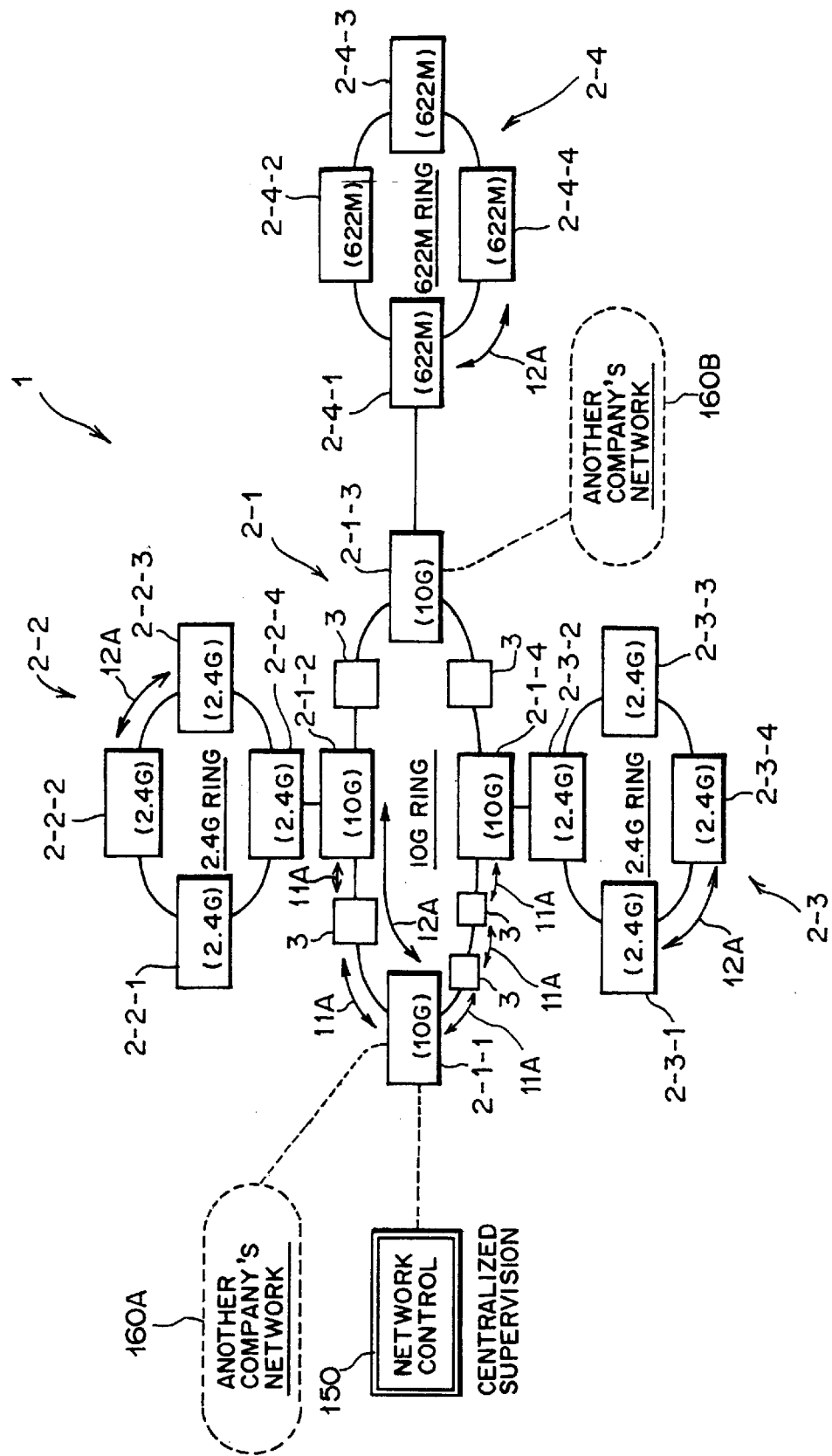
FIG. 1 is a block diagram showing a configuration of a SONET (SDH transmission system) serving as one embodiment of the present invention.

FIG. 1 is a block diagram showing a configuration of a SONET (SDH transmission system) serving as one embodiment of the present invention. In the SONET 1 shown in FIG. 1, a 10 G ring network 2-1 for handling a transmission frame (STS-192) of about 10 G b/s, 2.4 G ring networks 2-2, 2-3 for handling a transmission frame (STS-48) of about 2.4 G b/s, and a 622M ring network 2-4 for handling a transmission frame (STS-12) of about 622M b/s are similarly interconnected through transmission units (described infra) respectively serving as gateways.

Further, as shown in FIG. 1, for example, in the 10 G ring network 2-1 (hereinafter briefly referred to as A10 G ring 2-1"), a plurality of 10 G b/s line terminal multiplex relay transmission units (LTE: SDH transmission unit for multiplex relay) 2-1-1 to 2-1-4 and a plurality of 10 G b/s relay transmission units (REG: SDH transmission unit for relay) 3 are respectively connected in a ring manner. Similarly, in the 2.4 G ring networks 2-2, 2-3 (hereinafter briefly referred to as A2.4 G rings 2-2, 2-3"), 2.4 G b/s LTE 2-2-1 to 2-2-4, and 2-3-1 to 2-3-4 are respectively connected in the ring manner. In the 622M ring network 2-4 (hereinafter briefly referred to as A622M ring 2-4"), 622M b/s LTE 2-4-1 to 2-4-4 are connected in the ring manner.

Figure 13:
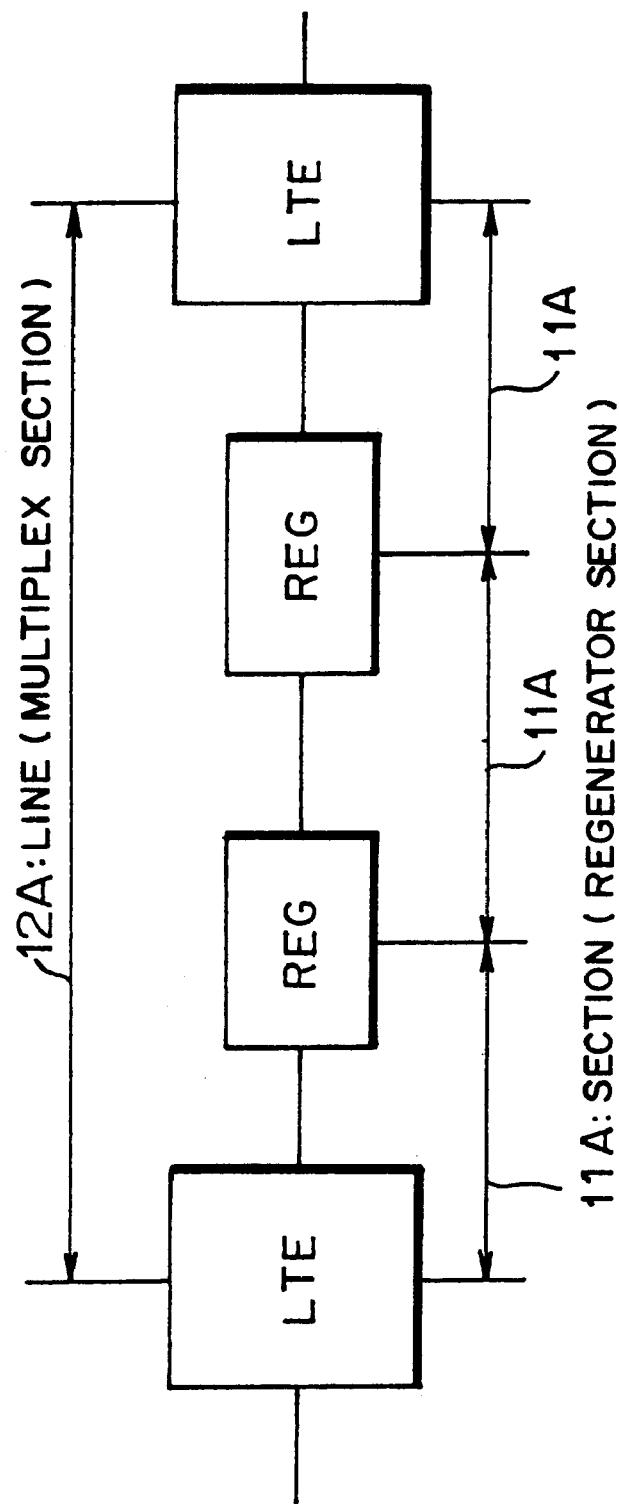
FIG. 13 is a diagram for explaining definition of sections and a line in the SONET transmission mode.
Figure 14:
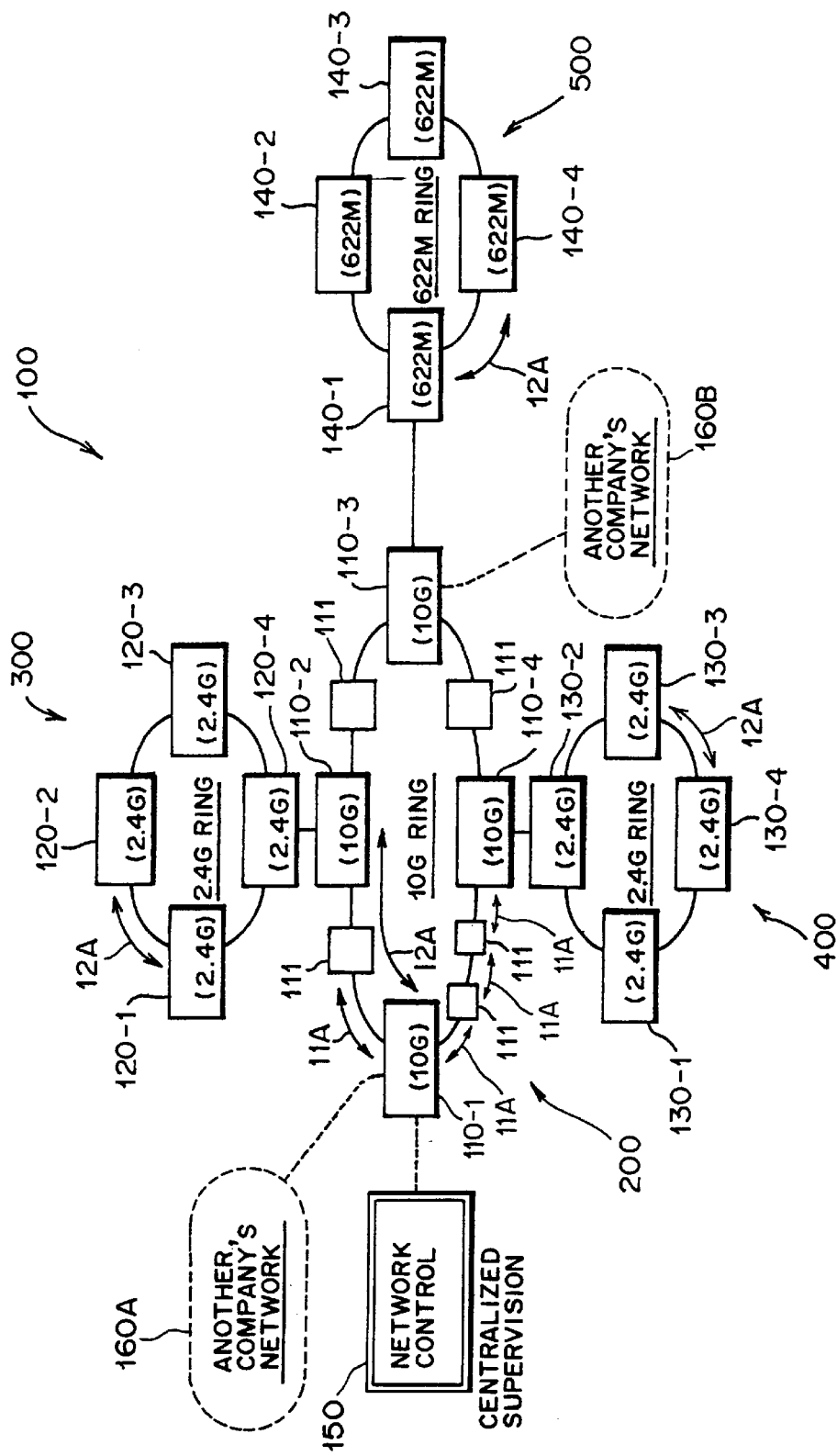
FIG. 14 is a block diagram showing one illustrative SONET (transmission system)
Figure 15:
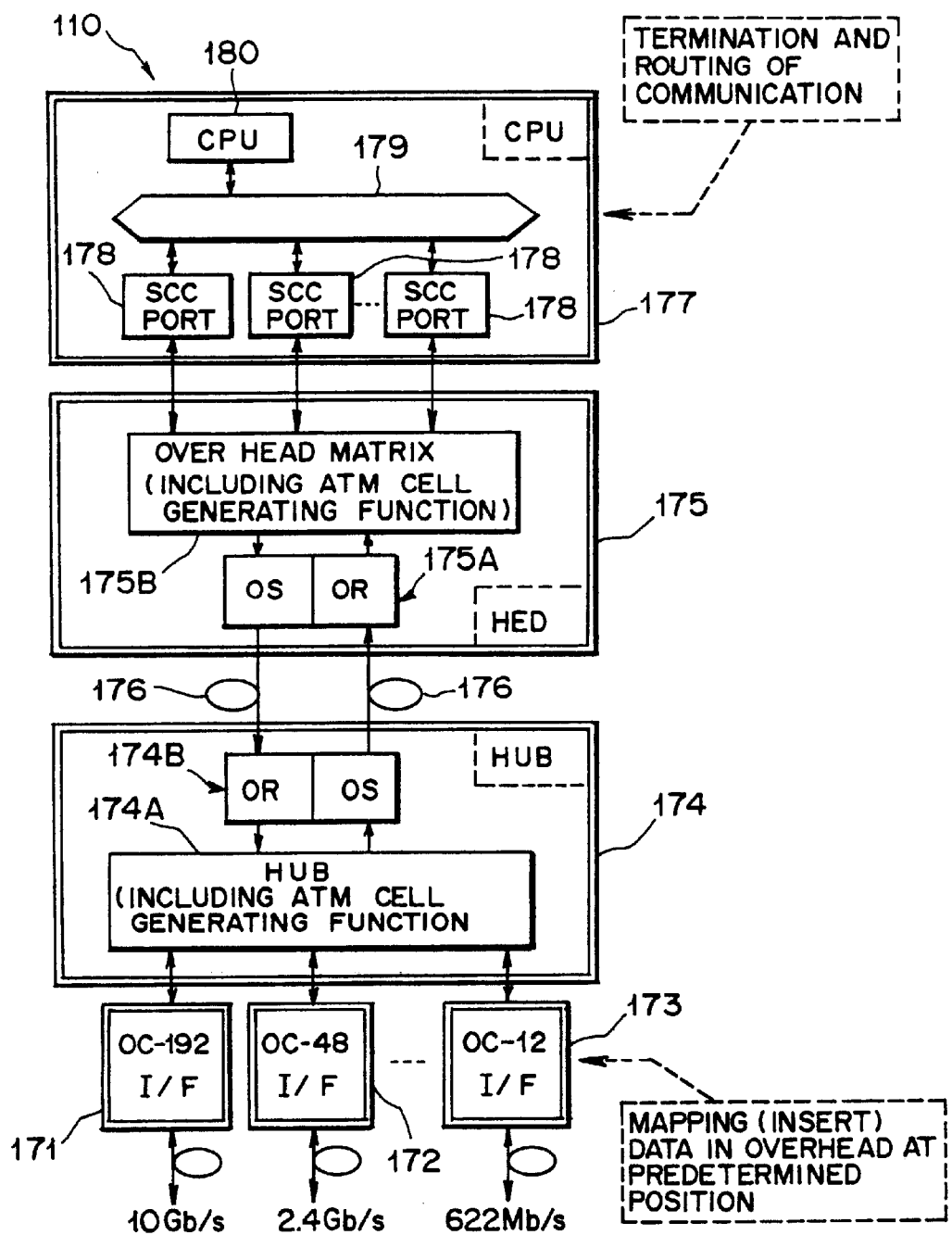
FIG. 15 is a block diagram showing an illustrative configuration of a transmission unit used in the SONET.
Figure 16A:
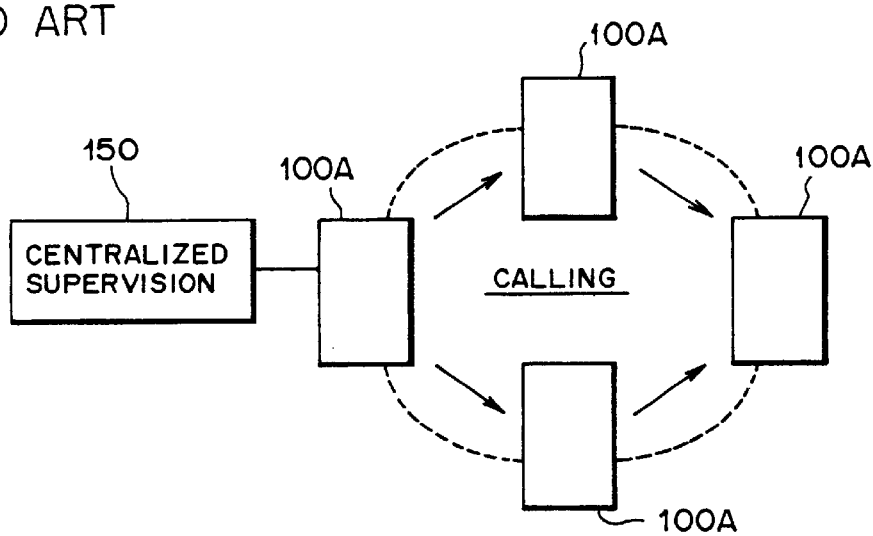
FIGS. 16(a) and 16(b) are typical diagrams for explaining a procedure for setting a communication path in the SONET.
Figure 16B:
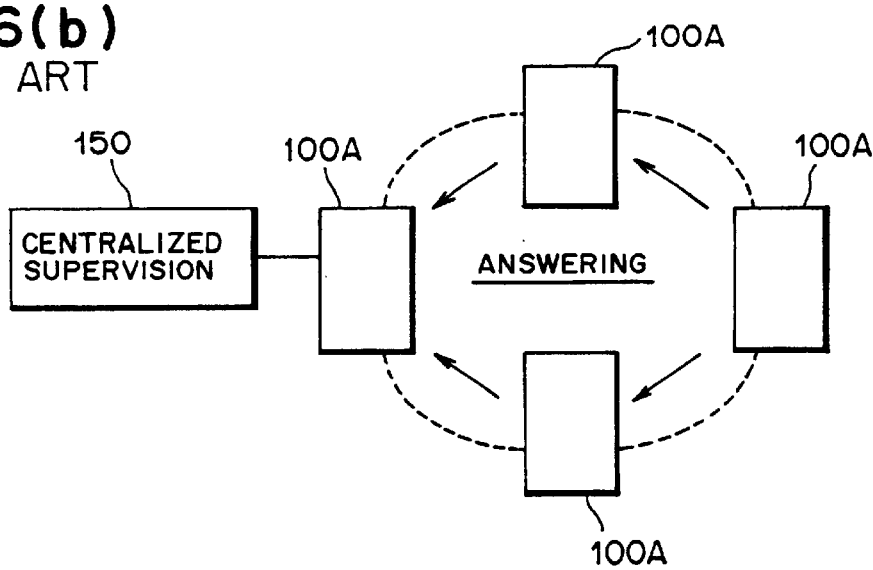
Figure 17:
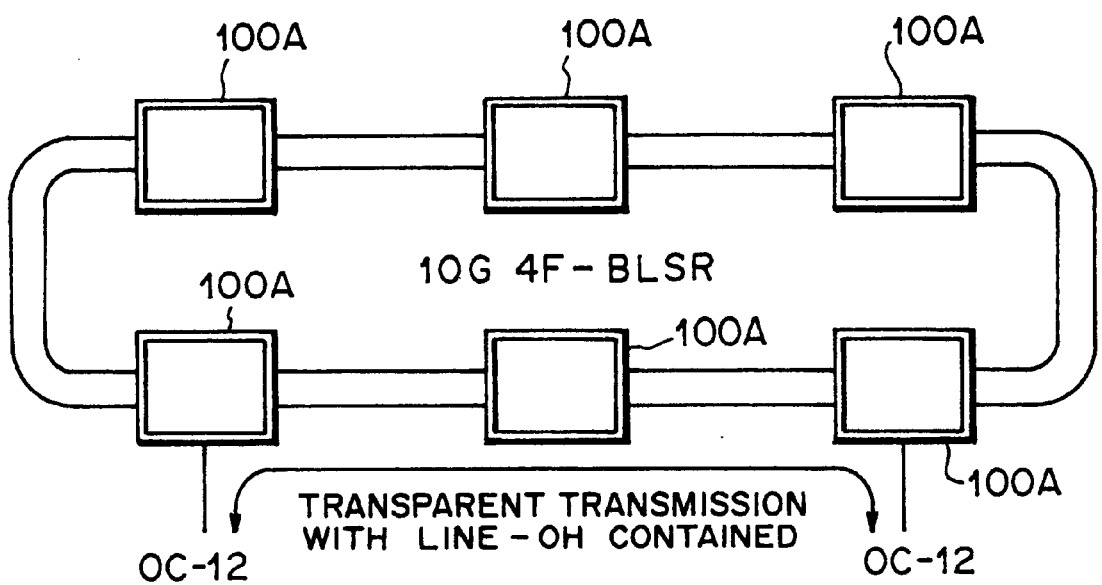
FIG. 17 is a typical diagram for explaining transparent transmission in the SONET.

Moreover, in the 10 G ring network 2-1, according to a distance for which the transmission frame (optical signal) can be transmitted by the LTE 2-1-*j* (where i=1 to 4), a proper number of REGs 3 are also mounted between the LTE 2-1-*j* forming the above section 12A to form the above section 11A (see FIG. 13). It is to be noted that the REGs may be mounted in the 2.4 G rings 2-2, 2-3, or in the 622M ring 2-4.

Figure 4:
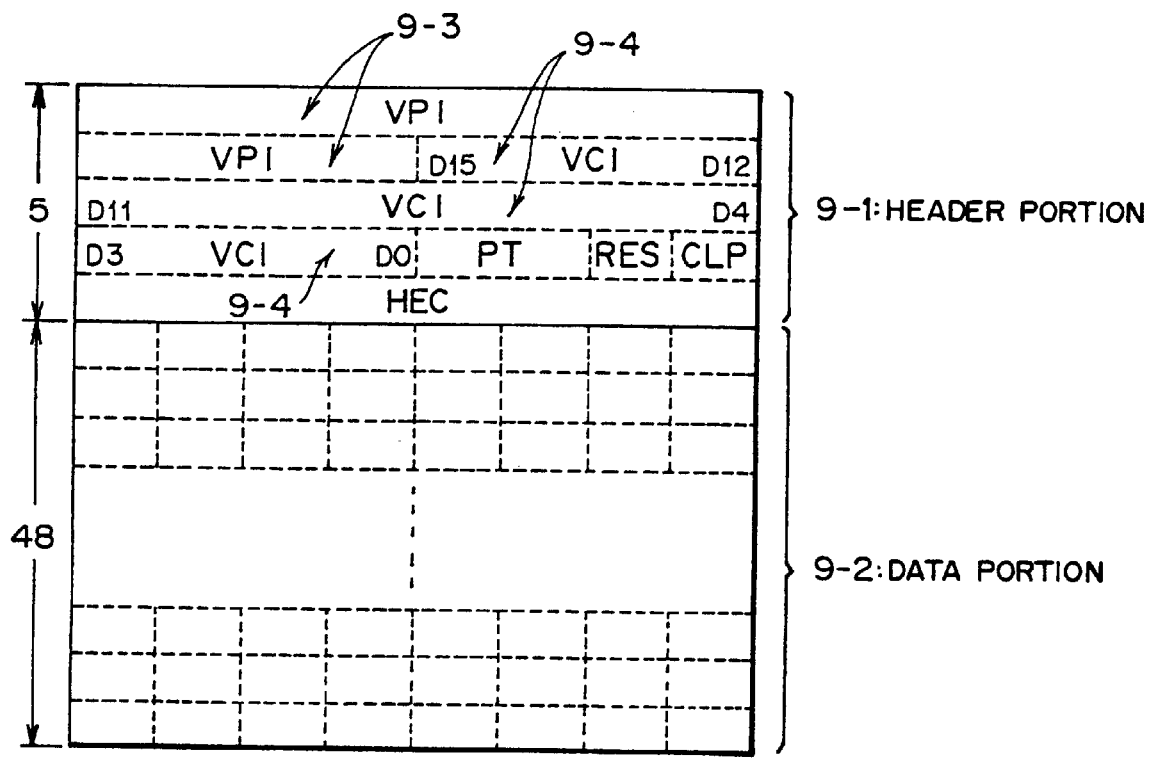
FIG. 4 is a diagram showing a format of an ATM cell in the embodiment.

Here, the LTE 2-*i-j* and the REG 3 forming the above rings 2-*i* (where i=1 to 4) respectively have the function of performing replacement (termination/insertion) processing of an overhead 10 (including both an SOH 11 and an LOH 12 in the case of the LTE 2-*i-j*, or the SOH 11 in the case of the REG 3) of a received transmission frame STS-n (STM-N). In the embodiment, it is possible to split (entirely or partially as required) into ATM (Asynchronous Transfer Mode) cells supervisory control information (such as D1 to D3 bytes for a DCC) of the system 1, or the overhead 10 of the transmission frame from other companies' networks 160A, 160B, and insert the ATM cells in a pace area (undefined portion) of the overhead 10. Moreover, the ATM cell (cell for asynchronous communication) handled in the embodiment is identical with typical one, and has a data format as shown in FIG. 4, including a header portion (communication control information portion) 9-1 of 5 bytes, and a data portion (communication data portion) 9-2 of 48 bytes, resulting in a total of 53 bytes.

Figure 2:
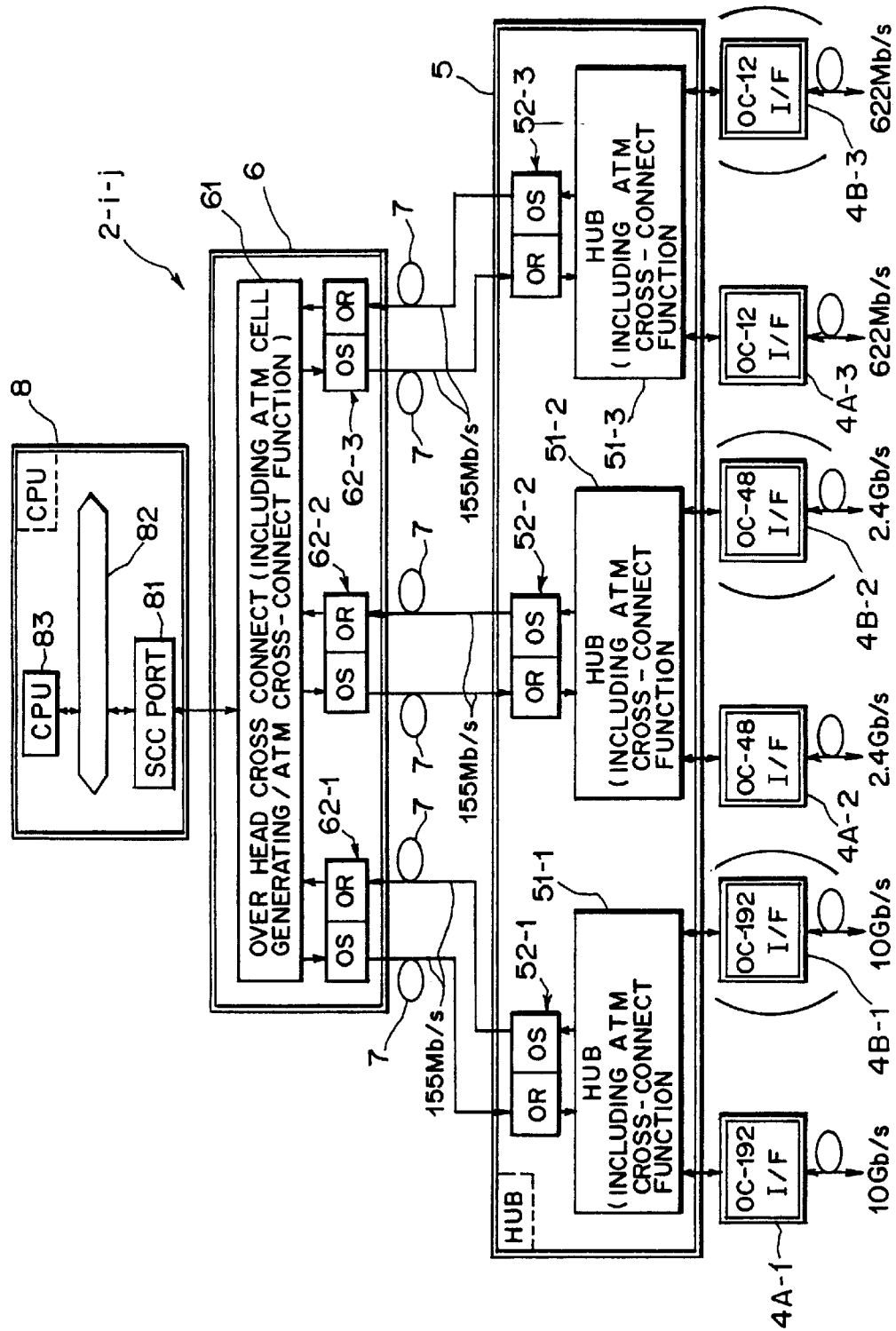
FIG. 2 is a block diagram showing a configuration of a transmission unit used in the SONET of the embodiment.

Hence, as shown in FIG. 2, the above LTE 2-*i-j* and REG 3 [hereinafter referred to as "transmission (node) unit 1A" unless the respective transmission (node) units are individually shown] include, with attention to the function of their essential parts, interface portions 4A-1 to 4A-3 corresponding to handled transmission frames (a speed of an accommodated line), a HUB circuit portion 5 and a HUB circuit portion 6 having an ATM cell splitting function and an ATM cross-connect function, optical fibers 7, a CPU circuit portion 8, and so forth.

Moreover, interface portions 4B-1 to 4B-3 are mounted when the interface portions 4A-1 to 4A-3 are made redundant as will be described infra.

Here, each of the above interface portions 4A-k (where k=1 to 3) outputs to the HUB circuit portion 5 normal overhead (OH) information (defined in the SDH) obtained by terminating (extracting) the overhead 10 of the received transmission frame (STS-n), while inserting the OH information from the HUB circuit portion 5 as an overhead 10 of a transmission frame for a transmission unit 1A serving as the next transmission destination.

Further, in the embodiment, as will be described infra, each of these interface portions 4A-k also has functions of extracting supervisory control information (such as D1 to D3 bytes for the DCC, and OH information from the other companies' networks 160A, 160B) inserted as the ATM cell in the space area of the overhead 10 of the received transmission frame, and inserting the supervisory control information input as the ATM cell through the HUB circuit portion 5 in the space area of the overhead 10 in the transmission frame for the above next transmission destination.

Besides, the HUB circuit portion 5 basically outputs the OH information extracted in the-above interface portion 4A-k to the CPU circuit portion 8 through the HED circuit portion 6, while outputting to the interface portion 4A-k the OH information input from the CPU circuit portion 8 through the HED circuit portion 6. In this discussion, an ATM optical link of 155M b/s is formed by the optical fibers 7 between the HUB circuit portion 5 and the HED circuit portion 6, and the above OH information is transmitted as the ATM cell through the optical link.

Hence, the HUB circuit portion 5 includes optical repeating regenerators (OR/OS) 52-1 to 52-3 functioning as an electro/optical interface with the optical fiber 7, and HUB portions 51-1 to 51-3 having ATM cell splitting and ATM cross-connect functions. These HUB portions 51-k (where k=1 to 3) split the OH information from the interface portions 4A-k into the ATM cells which are appropriately distributed to the side of the CPU circuit portion 8.

Further, in the embodiment, these HUB portions 51-k have, in addition to such a function, another function of distributing the ATM cell extracted in the interface portion 4A-k from the space area of the overhead 10 of the received transmission frame to any one of the side of the CPU circuit portion 8 and the side of the interface portion 4A-k according to a cross-connect setting as will be described infra.

Figure 3:
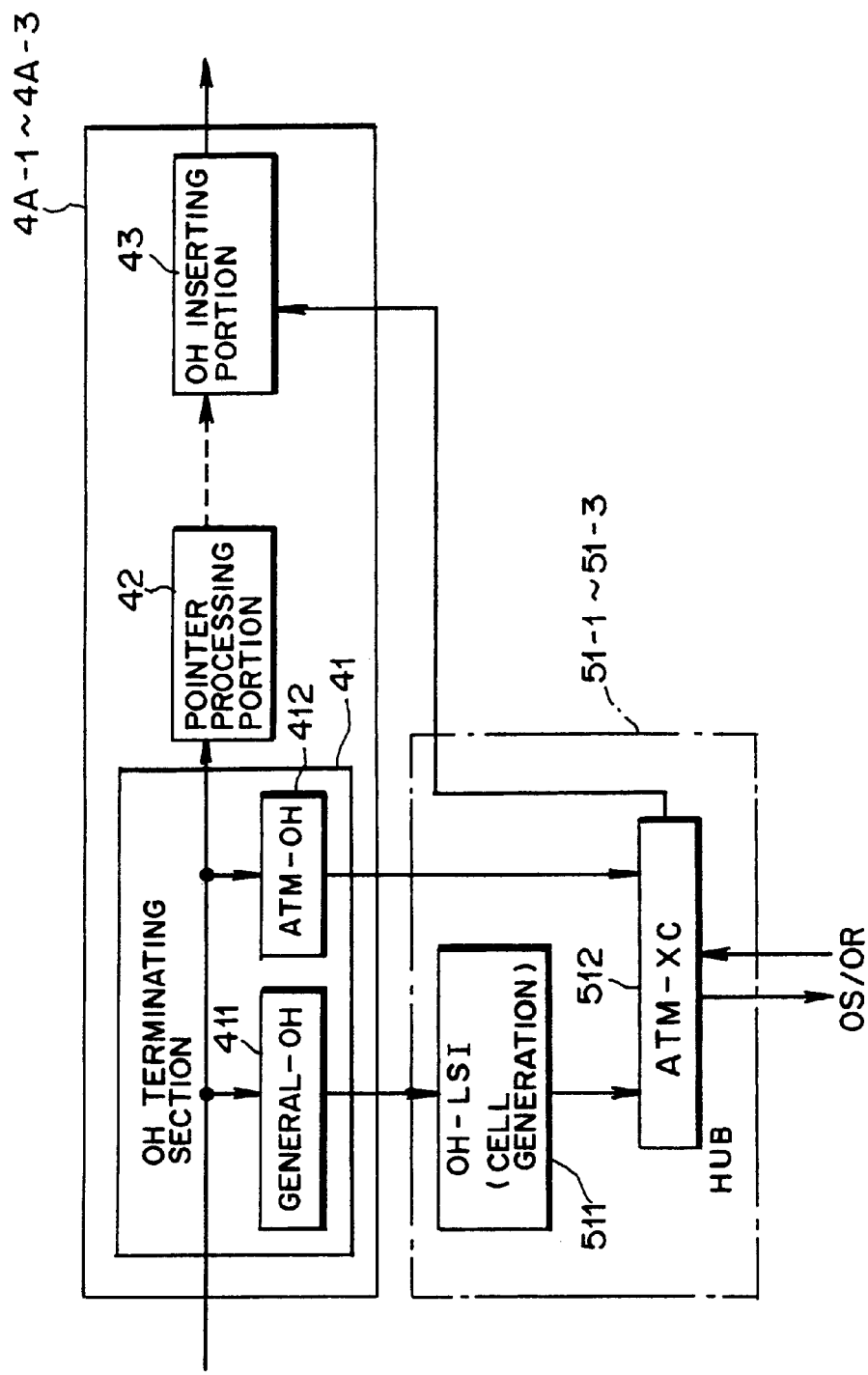
FIG. 3 is a block diagram showing configurations of an interface portion and a HUB portion in the transmission unit of the embodiment.

Hence, a portion including the above interface portion 4A-k and HUB portion 51-k is specifically configured as shown in FIG. 3. That is, the interface portion 4A-k includes, at least, an overhead terminating portion 41, a pointer processing portion 42, and an overhead inserting portion 43, and the HUB portion 51-k includes an ATM cell generating (splitting) portion (OH-LSI) 511 and an ATM cross-connect portion 512.

Here, in the interface portion 4A-k, the overhead terminating portion 41 terminates and extracts the overhead 10 of the received transmission frame. In the embodiment, the overhead terminating portion includes a general overhead extracting portion (second overhead information extracting portion) 411 to extract information (second overhead information set in an area other than the space area of the overhead 10) of the general (normal) overhead 10, defined in the SONET (SDH), and an ATM overhead extracting portion (first overhead information extracting portion) 412 to extract an ATM cell (first overhead information) inserted in the space area of the overhead 10.

Additionally, depending upon a pointer value set in an AU pointer 13 of the above overhead 10, the pointer processing portion 42 performs, for example, phase adjustment processing for synchronization between a transmission frame and a main signal [administrative data unit (VT) stored in a payload 20]. The pointer processing in the pointer processing portion 42 allows only the main signal to be output to the overhead inserting portion 43.

Further, the overhead inserting portion 43 inserts in (gives to) the main signal after the above pointer processing the overhead 10. In the discussion, the overhead inserting portion inserts (maps) the normal OH information processed in the CPU 83 of the undermentioned CPU circuit portion 8 in the overhead 10 at a predetermined position, while inserting in a space area of the overhead 10 the ATM cell (supervisory control information) distributed and input in the ATM cross-connect portion 512.

At this point in time, supervisory control information for the system 1 is inserted as the ATM cell in space areas of the SOHs 11 respectively terminated in the LTE 2-i-j and the REG 3 so as to enable an ATM communication (asynchronous communication) between the LTE 2-i-j and the REG 3. However, OH information from the other companies' networks 160A, 160B are inserted in a space area of an LOH 12 since it is necessary to regard the 10 G ring 2-1 as a virtual relay transmission unit.

Moreover, the SOH 11 has a transmission capacity of 3×3×n×8000×8=576,000×n (b/s). Defined bytes (2×n+7 bytes) are subtracted therefrom, thereby providing, as a transmission capacity of a space area, (3×3×n−2×n−7)× 8000×8=7 (n−1)×8000×8 (b/s).

For example,
85.568 (Mb/s) for STS-192 (10 G b/s)
21.056 (Mb/s) for STS-48 (2.4 G b/s)
4.928 (M b/s) for STS-12 (622M b/s)

On the other hand, the LOH 12 has a transmission capacity of 5×3×n×8000×8=960,000×n (b/s) A defined byte of n+14 is subtracted therefrom, thereby providing, as a transmission capacity of a space area, (5×3×n−n−14)×8000× 8=14 (n−1)×8000×8 (b/s).

For example,
171.568 (M b/s) for STS-192 (10 G b/s)
42.112 (M b/s) for STS-48 (2.4 G b/s)
9.856 (M b/s) for STS-12 (622M b/s)

Thus, when the above ATM cell (of 53 bytes) is inserted in the space area of the SOH 11, a transmission capacity thereof is
201,811 (Cells/s) for STS-192 (10 G b/s)
49,660 (Cells/s) for STS-48 (2.4 G b/s), or
11,622 (Cells/s) for STS-12 (622M b/s).

When inserted in a space area of the LOH 12, the transmission capacity is
403,622 (Cells/s) for STS-192 (10 G b/s)
99,321 (Cells/s) for STS-48 (2.4 G b/s), or
23,245 (Cells/s) for STS-12 (622M b/s).

It is thus understood that massive amounts of information (ATM cells) can be transmitted by using the space area of the overhead 10.

Subsequently, in the above HUB portion 52-k, the ATM cell splitting portion 511 splits into the ATM cells the OH information extracted in the normal overhead extracting portion 411 of the overhead terminating portion 41, and the ATM cross-connect portion 512 distributes the receive ATM cell to any one of the side of the CPU circuit portion 8 and the side of the overhead inserting portion 43 of the interface portion 4A-k depending upon destination (channel) information serving as communication control information set in the header portion (communication control information portion) 9-1 (see FIG. 4) of the received ATM cell. In this discussion, for example, the ATM cross-connect portion outputs, if the receive ATM cell has self-addressed destination information, the ATM cell to the side of the CPU circuit portion 8, while returning and outputting, if not the self-addressed destination information, the ATM cell to the overhead inserting portion 43.

In the respective transmission units 1A in the same ring 2-i, only the self-addressed ATM cell is thereby passed to the CPU circuit portion 8, and all the remaining ATM cells bypass the CPU circuit portion 8, and are inserted in the space area of the overhead 10 to be sequentially transmitted (transferred) to the next transmission destination.

Here, specifically, identification information (node ID) of the destination transmission unit 1A may be set as the above destination information of the ATM cell by using a VPI (Virtual Path Identifier) field (of 12 bits) 9-3 of the header portion 9-1 (see FIG. 4) or a VCI (Virtual Channel Identifier) field (of 16 bits) 9-4 (or using both the fields 9-3, 9-4). However, in the embodiment, in order to identify from which transmission unit 1A a receive ATM cell is transmitted, another source node ID is also set and combined therewith.

Moreover, 6 bits are assigned for each of the above node IDs when the VPI field 9-3 is used, and 8 bits are assigned for each of the above node IDs when the VCI field 9-4 is used. It is possible to basically optionally use any one of the fields 93 and 9-4. However, in order to, for example, transmit the above ATM cell to a subscriber unit, the VCI field 9-4 may preferably be used such that the ATM cell can directly pass through the existing ATM communication unit. The VPI field 9-3 may preferably be used for transmission in the network such as the above ring 2-*i* However, when the VPI field 9-3 is used for the transmission in the network, replacement of the VPI is not performed in each of the transmission units 1A unlike normal ATM communication.

Figure 5:
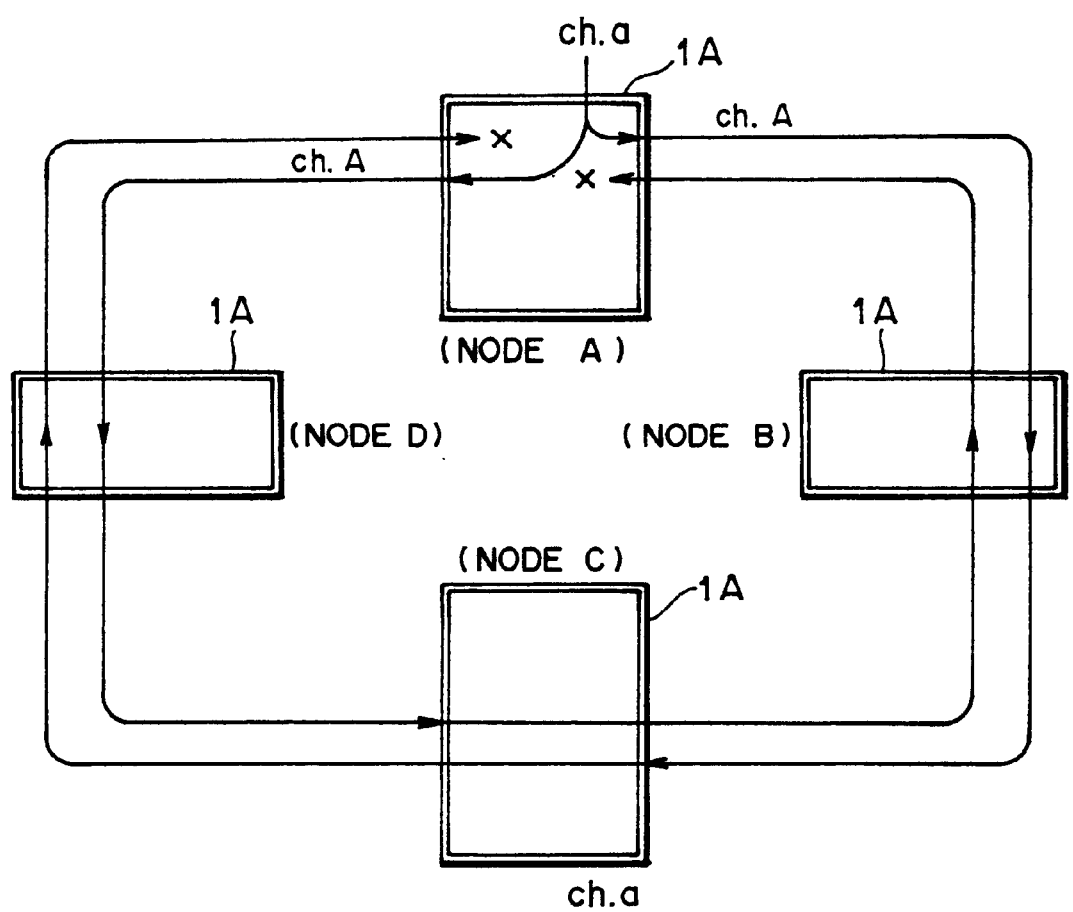
FIG. 5 is a typical diagram for explaining an operation of the SONET of the embodiment.

Further, in the embodiment, the ATM above cross-connect portion 512 has an additional function of discarding, when an own node ID is set in the header portion 9-1 as a source node ID in an ATM cell received from an additional transmission unit, the ATM cell (see FIG. 5). In the transmission unit 1A, it is thereby possible to avoid a phenomenon in that, for example, the ATM cell has no fixed destination by erroneously setting a node ID which can not be found in the system 1, and is left unerased indefinitely in the system 1, resulting in enhanced reliability of the system 1.

Next, in FIG. 2, the above HED circuit portion 6 distributes the ATM cell from the HUB portion 51-*k* of the HUB circuit portion 5 to any one of the CPU circuit portion 8 and the HUB portions 51-*k* of the HUB circuit portion, while splitting into ATM cells the OH information from the CPU circuit portion 8, and distributing the ATM cell to any one of the HUB portions 51-*k*. Hence, the HED circuit portion 6 includes an overhead cross-connect portion 61 having an ATM cell splitting function and an ATM crossconnect function, and optical repeating regenerators (OR/OS) 62-1 to 62-3 functioning as an electro/optical interface with the optical fibers 7.

Here, if an own node ID is set as destination information in the VPI/VCI fields 9-3, 9-4 of the ATM cell received from the HUB circuit portion 5, the above overhead cross-connect portion 61 is basically set to output the data portion 9-2 of the ATM cell to the CPU circuit portion 8. In the transmission units 2-1-2, 2-2-4, 2-3-4, and 2-4-1 (hereinafter referred to as "transmission unit 1B" unless the respective transmission units are individually shown) serving as the gateways connected to the additional rings 2-*i*, an additional setting is made to return and output, among ATM cells provided with the own node ID, the ATM cells having transmission instruction information showing as a destination the transmission unit 2-*i*-*j* forming the additional ring 2-*i* to the corresponding HUB portion 51-*k* and interface portion 4A-k.

That is, when in the header portion 9-1 of the ATM cell is set the transmission instruction information showing as a destination the transmission unit 1A in the additional ring 2-*i* (another SDH transmission system), the above overhead cross-connect portion 61 transmits the ATM cell to the transmission unit 1A in the above additional ring 2-*i*. However, the setting is made for only the LTE 2-*i*-*j* because it is basically unnecessary for the REG 3.

The ATM cell addressed to the transmission unit 1A in the additional ring 2-*i* is thereby returned to the side of the additional ring 2-*i* in the HED circuit portion 6 of the transmission unit 1B serving as the gateway. In the ring 2-*i*, the ATM cell bypasses the CPU 83, and passes through each of the transmission units 1A to be sequentially transmitted until the ATM cell reaches the transmission unit 1A having a destination node ID.

Moreover, in this case, it is possible to set the above transmission instruction information by using the VPI field 9-3 of the ATM cell. For example, when the assumption is made that the ATM cell transmitted over the 10 G ring 2-1 has a VPI "00," value other than "00" is set in the VPI field 9-3 of the ATM cell addressed to the transmission unit 2-2-*j* in the 2.4 G ring 2-2, and at least both a node ID of the destination transmission unit 2-2-*j* and a node ID of the transmission unit 2-1-2 serving as the gateway are set in the VCI field 9-4.

Thereby, as shown in FIG. 5, in the transmission unit 2-1-2, the HUB portion 52-1 distributes the receive ATM cell to the side of the CPU circuit portion 8 and outputs the receive ATM cell to the HED circuit portion 6 since an own node ID is set in the receive ATM cell. Further, since the received ATM cell has a VPI value other than "00," the HED circuit portion 6 returns the ATM cell to the HUB portion 52-2 so as to transmit the ATM cell to the 2.4 G ring 2-2 through the 2.4 G interface portion 4A-2 (drop on the tributary side).

That is, the above-mentioned HUB circuit portion 5 and HED circuit portion 6 function as a distribution control portion (asynchronous communication control portion) to distribute to the overhead inserting portion 43 the ATM cell (first overhead information) other than a self-addressed ATM cell so as to insert the ATM cell in the space area of the overhead 10 for the additional transmission unit 1A depending upon the destination information set in the header portion 9-1 of the ATM cell. The transmission unit 1B serving as the gateway can also transmit the received ATM cell to the additional ring 2-*i*.

Further, in the embodiment, a portion including the above ATM cross-connect portion 512 and overhead cross-connect portion 61 functions as a switching mechanism portion to output, when self-addressed destination information is set in the header portion 9-1 of the received ATM cell, the ATM cell to the CPU circuit portion 8, while outputting, when the destination information is different from the self-addressed destination information, the ATM cell to the overhead inserting portion 43.

Subsequently, the CPU circuit portion (main communication control portion) 8 basically causes the CPU 83 to perform communication processing for a supervisory control concerning the system 1 depending upon the OH information extracted in the normal overhead extracting portion 411 of the interface portion 4A-*k* and received through the HUB circuit portion 5 and the HED circuit portion 6. In this discussion, the above-mentioned cross-connect setting for the ATM cell enables the processing for only the self-addressed information including supervisory control information of the above ATM cell.

In the CPU circuit portion 8 in the embodiment, it is thereby possible to considerably reduce the number of active SCC ports 81 having access to the CPU 83 through a bus 82 unlike a conventional method. That is, in the system 1 in the embodiment, a partial byte (the D1 to D3 bytes for the DCC communication in this discussion) defined in the overhead 10 is inserted as the ATM cell in the space area of the overhead 10, thereby significantly reducing an amount of information transmitted to the CPU 83.

On the other hand, the supervisory control information to be transmitted to the additional transmission unit 1A after the processing in the above CPU 83 is output to the overhead cross-connect portion 61 through the bus 82 and the SCC port 81, and is split into ATM cells in the overhead cross-connect portion 61 to be transmitted after being inserted in the space area of the overhead 10 in a transmission frame for the next transmission destination through the corresponding HUB portion 51-*k* and interface portion 4A-k.

That is, the above overhead cross-connect portion 61 also functions as an ATM cell generating portion to generate the ATM cell addressed to the additional transmission unit 1A. The function generates the ATM cell with the header portion 91 (VPI/VCI) in which a node ID of the additional transmission unit 1A serving as a transmission destination and an own (source) node ID are set. However, when the transmission destination is the transmission unit 1A in the additional ring 2-*i* as set forth above, identification information of the transmission unit 1B serving as the gateway is also set together therewith.

Further, in this case, a cross-connect setting is made to the above overhead cross-connect portion 61 and the ATM cross-connect portion 512 of the HUB portion 51-*k* such that the ATM cell generated as described above can be output to the overhead inserting portion 43 of the corresponding interface portion 4A-1 so as to be inserted in a space area of the overhead 10 in a transmission frame for the next transmission destination. With the simple setting, it is possible to transmit the supervisory control information to be posted to the additional transmission unit 1A after inserting the information in the space area of the overhead 10 as the ATM cell.

This allows the supervisory control information of the ATM cell to be freely transmitted over the entire system (network) 1 until the ATM cell reaches the transmission unit 2-*i*-*j* serving as the transmission destination irrespective of the section 11A or the line 12A formed by the transmission units 1A in the respective rings 2-*i*.

That is, in the system 1 of the embodiment,the network section is mounted to carry out the communication for the supervisory control irrespective of the section 11A and the line 12A in the network 1 in addition to the section (relay section) 11A to carry out a communication by transmitting the transmission frame between the LTE 2-*i*-*j* and the REG 3 or between the REGs 3, and the line (multiplexing section) 12A to carry out a communication by transmitting a transmission frame between the LTE 2-*i*-*j*, both of which are defined in the SONET (SDH).

Thus, in the respective transmission units 1A, it is possible to reduce the load of communication processing for the supervisory control by the CPU 83 so as to leave a margin for processing of the CPU 83, thereby stabilizing the communication in the entire system 1.

Besides, in this case, it is possible to transparently transmit through the above network section OH information in conformance with different specifications, sent from the other companies' networks 160A, 160B, resulting in a normal connection to the other companies' networks 160A, 160B.

Further, specifically, in the embodiment, the area is reserved for the ATM communication on the overhead 10 (the ATM cell is inserted in the space area of the overhead 10), thereby carrying out the ATM communication for the supervisory control (constructing the ATM link) in the above network section. Consequently, it is possible to provide the following advantages:

Since the space area of the overhead 10 is not fixedly used unlike a conventional method, it is possible to considerably enhance versatility and expandability of the communication processing for the above supervisory control.

Since the ATM cell enables the asynchronous transmission of the supervisory control information, it is possible to carry out the asynchronous communication for the supervisory control without much concern for a clock of the transmission frame, resulting in an extremely easy communication control.

It is possible to apply the existing ATM communication technique, resulting in very high practicability.

Besides, in the embodiment, by inserting the above ATM cell in the SOH 11 or the LOH 12, the ATM communication can be carried out in the above network section through the LTE 2-*i*-*j* or the REG 3. It is thereby possible to carry out a communication with the desired LTE 2-*i*-*j* and the desired REG 3 in the network section. Thus, an additional contribution is made to flexibility of the ATM communication for the supervisory control in the above network section.

Further, in the embodiment, the ATM cell is transmitted to the desired transmission unit 1A depending upon the VPI/VCI of the header portion 9-1. Consequently, the extremely easy control realizes a high-speed communication in the above network section. Additionally, it is possible to control a transmission destination (that is, a communication partner) of the ATM cell by simply controlling the VPI/VCI, resulting in a very simplified control of the transmission destination.

Further, in the VPI field 9-3 and the VCI field 9-4 of the ATM cell are set the node ID of the transmission unit 1A serving as the transmission destination of the ATM cell, and the node ID of the transmission unit serving as the source of the ATM cell. Therefore, the transmission unit 1A serving as the transmission destination can identify that signals, even with the same transmission destination node ID, respectively contain different communication data as long as the source node IDs are different. As a result, even when cells with the same transmission destination node ID are transmitted from the plurality of transmission units 1A, it is possible to continuously carry out a normal communication.

For example, when a line trouble occurs in the ring 2-*i* having a UPSR (Uni-Directional Switched Ring) configuration (described infra), an alarm signal should be transmitted after being inserted in the space area of the overhead 10 as the supervisory control information (ATM cell). However, the transmission unit 1A serving as the transmission destination can identify the source of the ATM cell depending upon the source node ID. Accordingly, it is possible to surely avoid erroneous recognition in that, for example, an alarm is given in a signal from the transmission unit 1A which is not affected by the faulty line, resulting in a continuation of the normal communication.

Further, in the embodiment, the cross-connect setting is made to the HED circuit portion 6 (the overhead cross-connect portion 61) of the transmission unit 1B serving as the gateway. It is thereby possible to transmit the received ATM cell to the transmission unit 1A in the additional ring 2-*i* as required (open a communication path to the additional ring 2-*i*). Thus, the ATM communication an flexibly be applied to any type of network (system) topology. In particular, in the above-mentioned illustration, according to the VPI value of the ATM cell, only the corresponding ATM cell can be transmitted to the additional ring 2-*i* through the transmission unit 1B serving as the gateway. It is thereby possible to prevent transmission of an unnecessary ATM cell.

Moreover, the cross-connect setting can automatically be made to the HED circuit portion 6 (the overhead cross-connect portion 61) of the transmission unit 1B serving as the above gateway as long as, for example, a communication path is established by a communication through the DCC between the CPUs 83 of the respective transmission units 1B, and the respective transmission units 1B feed their communication path information to the overhead cross-connect portion 61.

Figure 6:
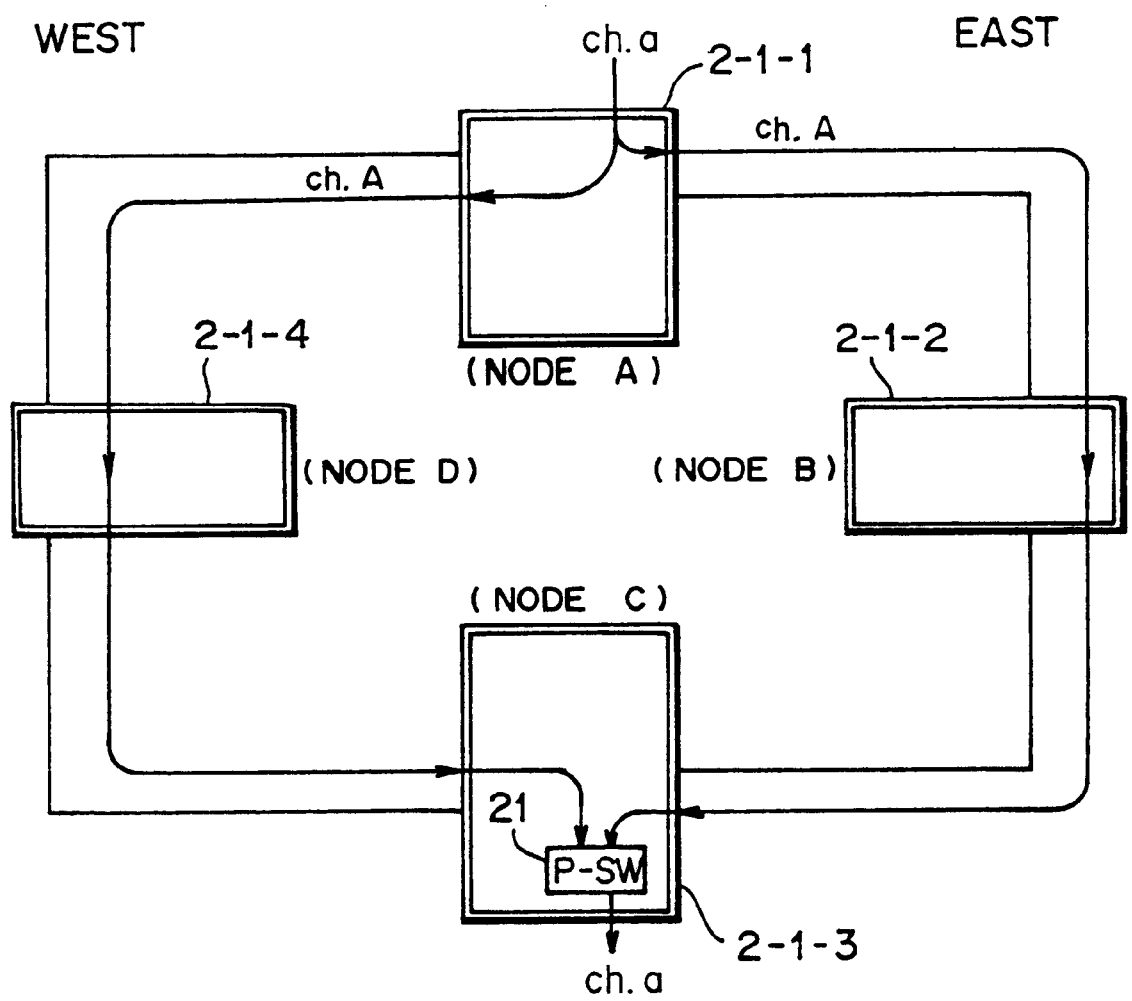
FIGS. 6 to 8 are typical diagrams for respectively explaining redundancy of a communication route in the SONET of the embodiment.

Meanwhile, in the above-mentioned system 1, for example, the communication path for the supervisory control in the 10 G ring 2-1 (the communication in the network section) may have the UPSR configuration in which, as typically shown in FIG. 6, the same signal (supervisory control information of the ATM cell) is transmitted from the node unit 2-1-1 to the EAST side (the right) and the WEST side (the left) of the ring 2-1, and each of the above signals is selected by an ATM path switch 21 mounted in the node unit 2-1-3 serving as a receiving end office.

That is, in the system 1 in this case, the above network section is made redundant by setting the two communication routes on the EAST side and the WEST side in the 10 G ring 2-*i*. When one communication route becomes unavailable due to a trouble or the like, the communication for the supervisory control is carried out by using the other communication route. Moreover, for example, a VP-AIS (Virtual Path-Alarm Indication Signal) is used for a trouble notice at the point in time.

Hence, at least, in the node unit 2-1-1, in the configuration shown in FIG. 2, the interface portions 4A-k are respectively made redundant (interface portions 4B-k are provided), and the overhead cross-connect portion 61 of the HED circuit portion 6 or the HUB portion 51-*k* of the HUB circuit portion 5 generates two ATM cells having the same communication data through cell copy so that the respective ATM cells can be transmitted after being inserted in the space area of the overhead 10 in the overhead inserting portions 43 of the respective interface portions 4A-k, 4B-k.

Moreover, the above cell copy may basically be carried out in any one of the overhead cross-connect portion 61 and the HUB portion 52-*k*, and is more easily carried out in the overhead cross-connect portion 61 since the overhead cross-connect portion 61 has the function as the ATM cell generating portion as described above. However, the cell copy may be carried out in the HUB portion, 52-*k* when a consideration is given to the transmission load on the optical fiber 7.

On the other hand, in the configuration shown in FIG. 2, in the node unit 2-1-3 serving as the receiving end office, the ATM path switch 21 is mounted to have a function of selecting a signal with higher signal-quality in the HUB portion 51-*k* of the HUB circuit portion 5 or in the overhead cross-connect portion 61 of the HED circuit portion.

Moreover, since the ATM path switch 21, when mounted to the HUB portion 51-*k*, takes input signals on the EAST side and the WEST side from different ports (outputs of the interface portions 4A-k, 4B-k) is possible to identify the signals. However, when mounted to the overhead cross-connect portion 61, the ATM path switch can not identify signals because the signals are respectively extracted in the interface portions 4A-k, 4B-k, and are multiplexed in the optical repeating regenerator 52-*k* of the HUB circuit portion 5.

Then, when the ATM path switch 21 is mounted to the overhead cross-connect portion 61, at least, at a time of cell copy in the overhead cross-connect portion 61 of the node unit 2-1-1 serving as a sending end office, as destination information of each ATM cell is set flag information for identification of whether the ATM cell itself is the ATM cell sent to the EAST side or the ATM cell sent to the WEST side in addition to the above transmission destination node ID and the source node ID.

Moreover, in this case, bit assignment is made, for example, as follows:

<When Using VPI Filed (12 bits) 9-3>

5 bits (=transmission destination node ID)+5 bits (=source node ID)+2 bits (=flag information)

<When Using VCI Filed (16 bits) 9-4>

7 bits (=transmission destination node ID)+7 bits (=source node ID)+2 bits (=flag information)

According to the configuration as stated above, in the system 1, the ATM path switch 21 of the node unit 2-1-3 selects the signal with higher signalquality from among the signals (ATM cells) on the EAST side and the WEST side, and automatically selects, if one (a part of the network section) of the communication routes on the EAST side and the WEST side becomes unavailable due to occurrence of a trouble or the like, the signal from the other communication route in which no trouble occurs.

Therefore, even when the trouble occurs on any one of the EAST side and the WEST side, it is possible to normally continue the communication for the supervisory control in the above network section. Consequently, it is unnecessary to reestablish the communication path for the supervisory control unlike a conventional method, resulting in significantly enhanced reliability of the system 1. In particular, since the 10 G ring 2-1 to which the other companies' networks 160A, 160B are connected has the UPSR configuration, it is possible to additionally enhance reliability of the transparent transmission of the above OH information from the other companies' networks 160A, 160B.

Figure 7:
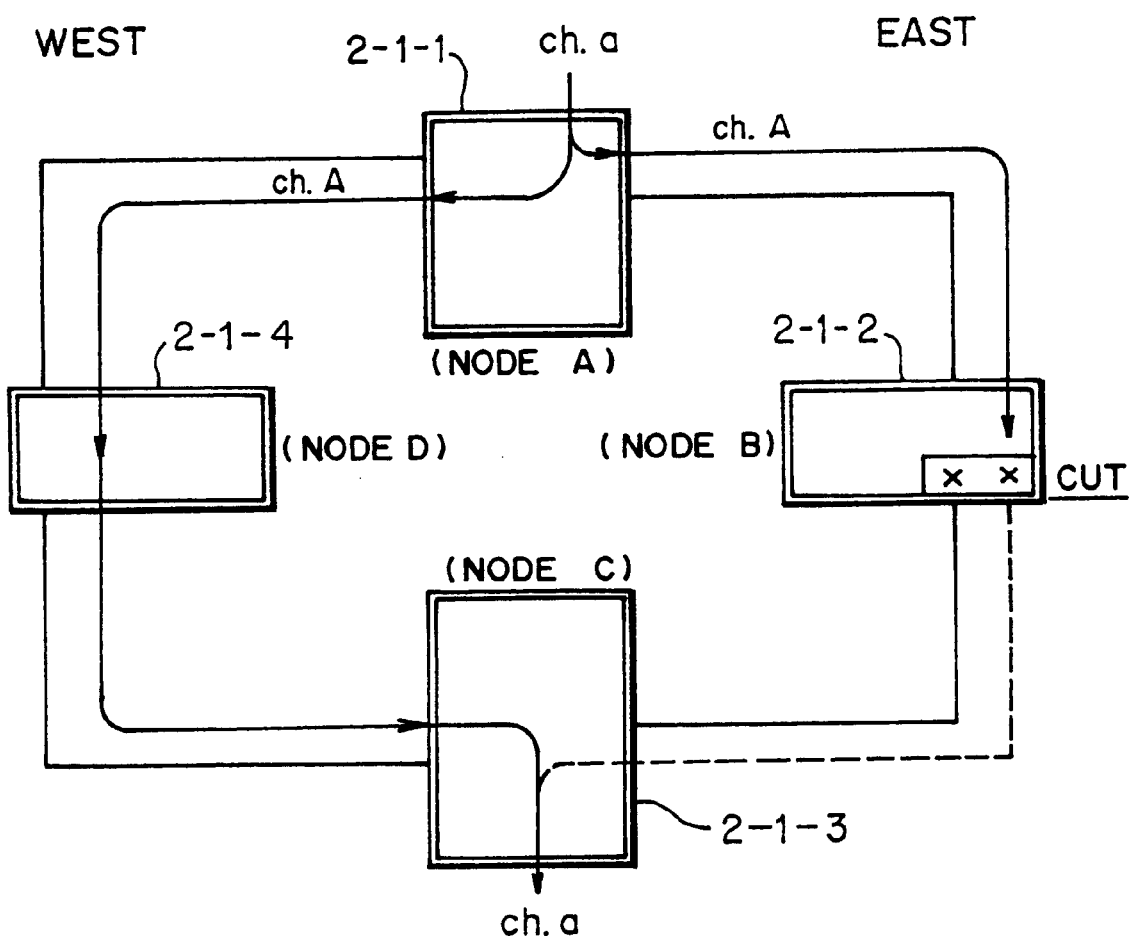

Moreover, in the system 1 having the above UPSR configuration, as typically shown in FIG. 7, the node unit 2-1-2 (or the node unit 2-1-4) may previously cut and set to an unavailable state a signal (one communication route) on the EAST side (or the WEST side), and the receiving end office 2-1-3 may take as input only a signal from the WEST side (or the EAST side).

Specifically, in order to realize such a setting, for example, a setting may be made to discard an ATM cell from the EAST side (or the WEST side) in the ATM cross-connect portion 512 of the HUB portion 51-*k* in the node unit 2-1-2 (or the node unit 2-1-4).

Thereby, in the system 1, since only any one of the above communication routes is used, in the node unit 2-1-3 to terminate the communication routes, it is unnecessary to select the communication route while continuously supervising in which of the communication routes the trouble occurs. Thus, it is possible to simplify the configuration of the above path switch 21, and simplify, at least, the node unit 2-1-3 serving as the receiving end office.

Figure 8:
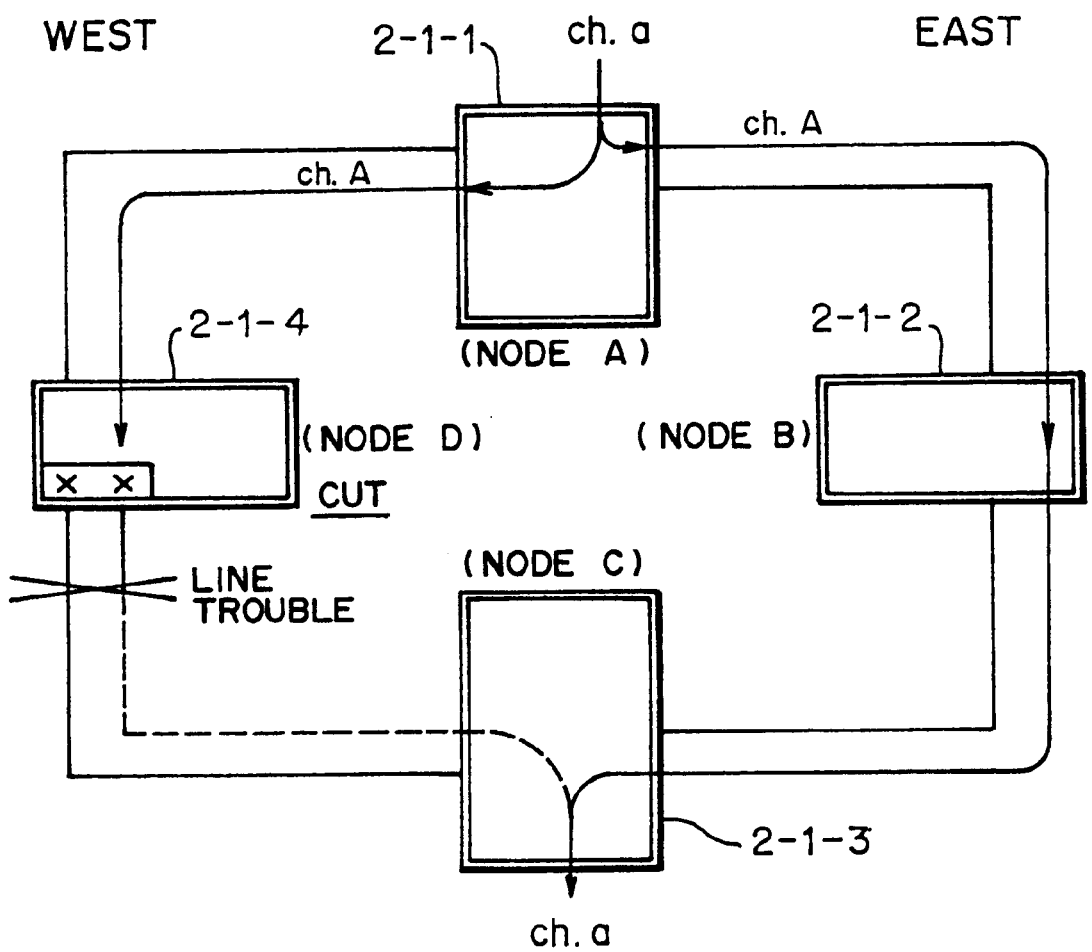
Figure 9:
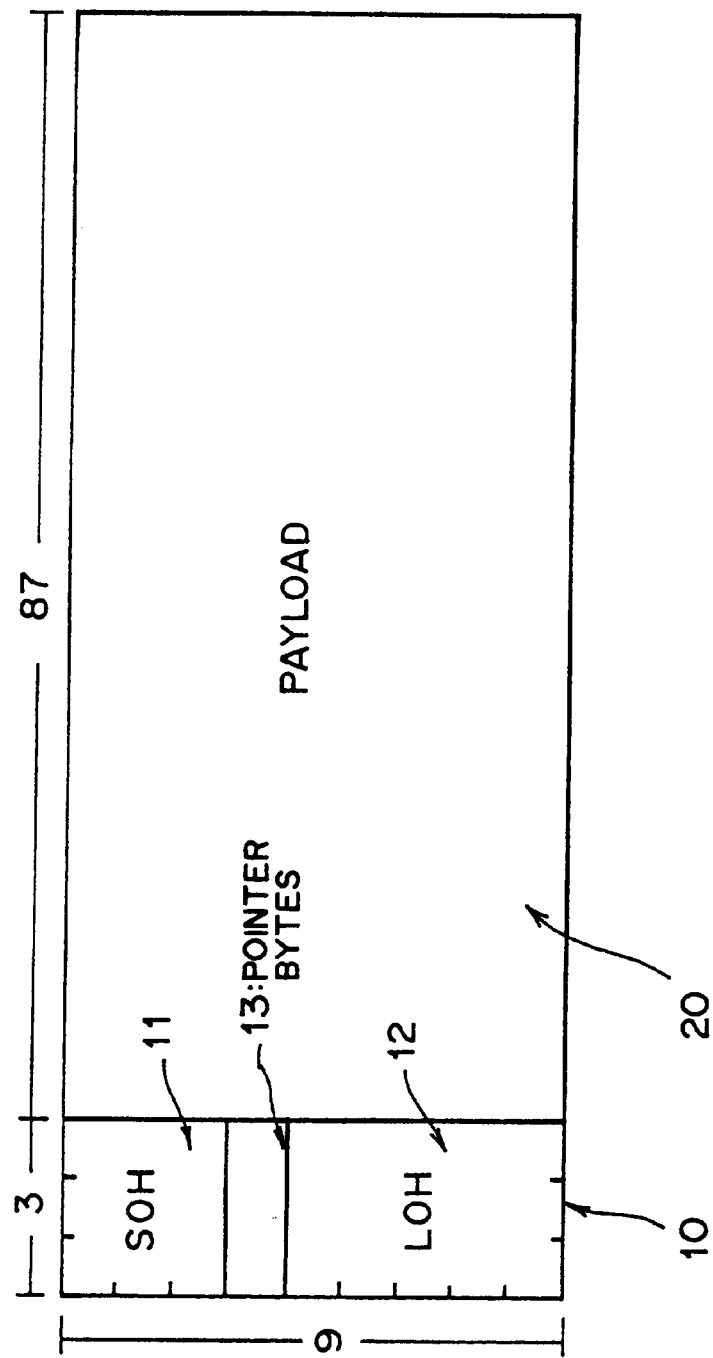
FIG. 9 is a diagram showing a format of a basic transmission frame handled in a SONET (SDH) transmission mode.
Figure 10:
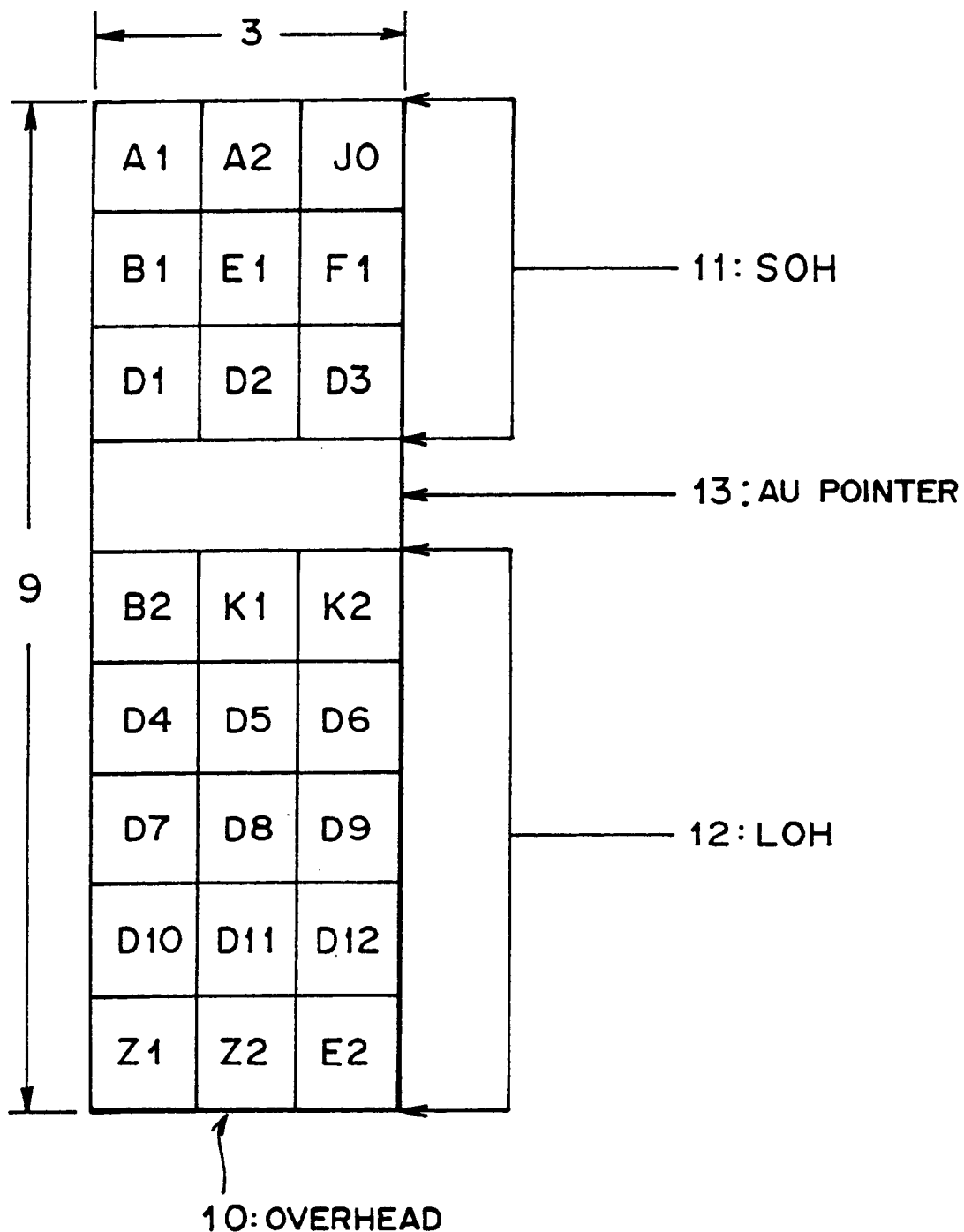
FIG. 10 is a diagram showing a specific configuration of an overhead of the basic transmission frame.
Figure 11:
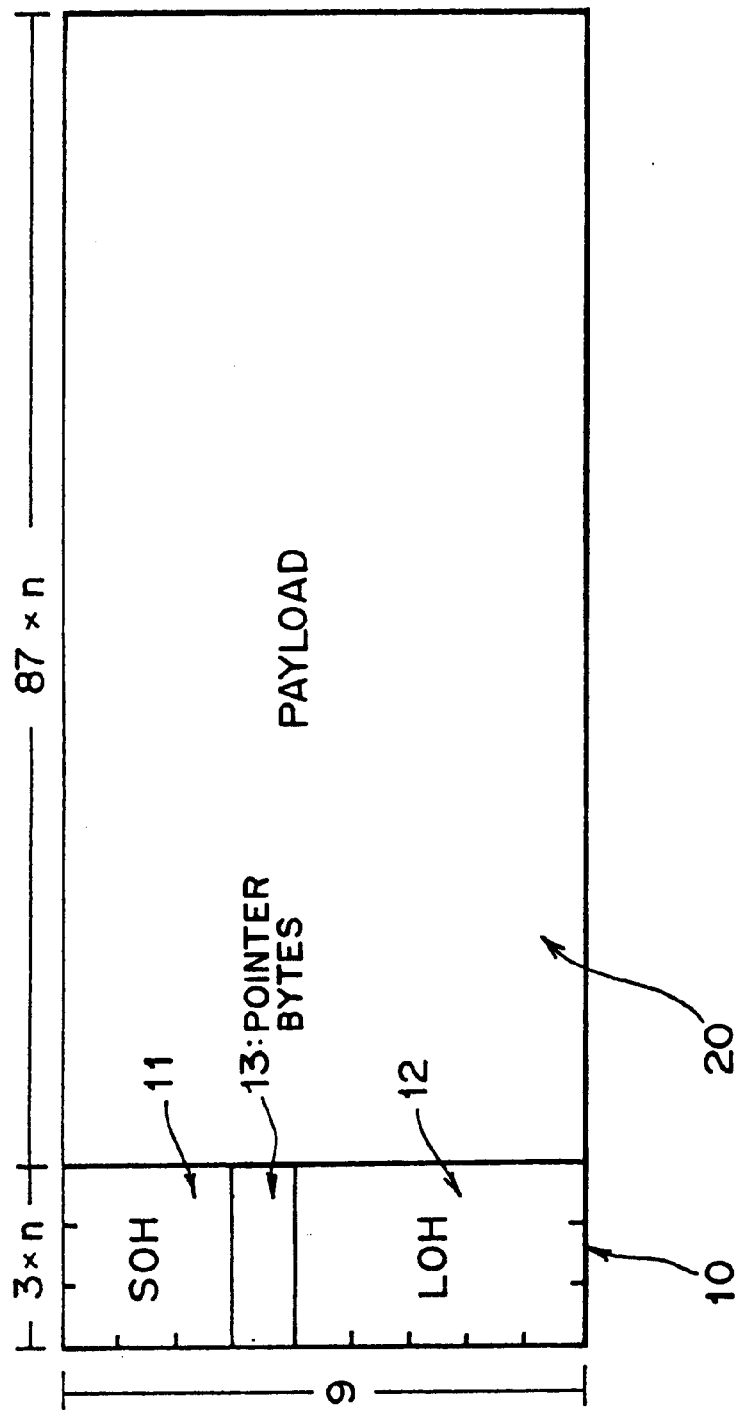
FIG. 11 is a diagram showing a format of a transmission frame (STS-n) in the SONET transmission mode.
Figure 12:
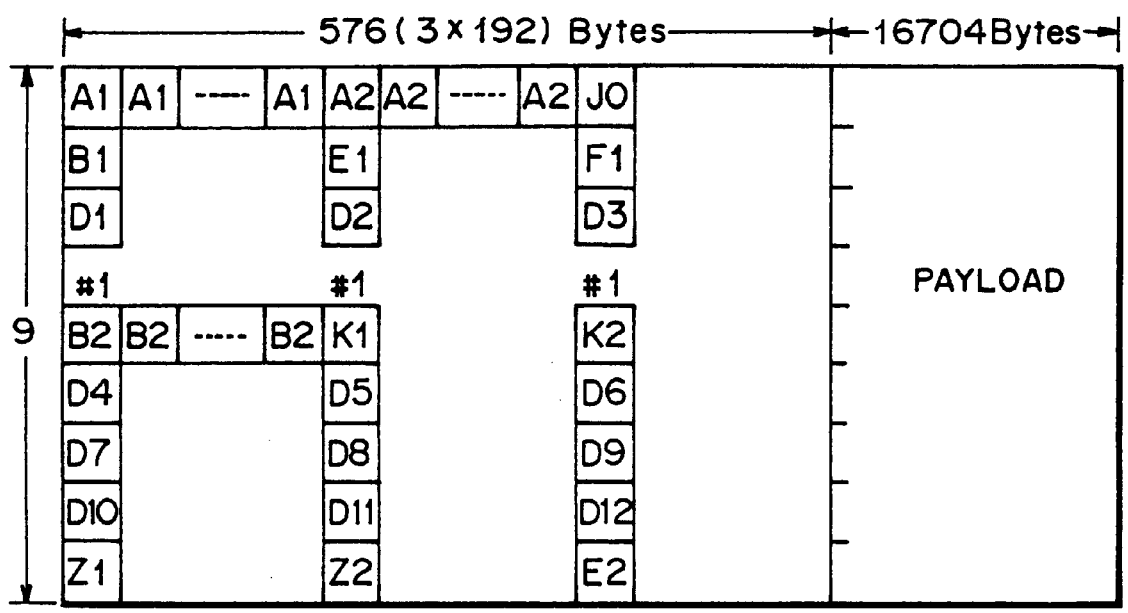
FIG. 12 is a diagram showing a format of an STS-192 in the SONET transmission mode.

However, in this case, no signal can be communicated when the uncut communication route on the WEST side (or the EAST side) becomes unavailable due to occurrence of a trouble. Hence, the node unit 2-1-4 (or the node unit 2-1-2) sends a trouble concurrence notice to the node unit 2-1-2 (or the node unit 2-1-4). As typically shown in FIG. 8, a position at which the above communication route is cut is switched over from the node unit 2-1-2 to the node unit 2-1-4, thereby setting to an available state the communication route which has been set to the unavailable state. Moreover, the above trouble occurrence notice can be sent in, for example, a method similar to an orderwire cut.

Thus, even when the trouble occurs on any one of the EAST side and the WEST side, it is similarly possible to normally continue the communication in the above network section. Consequently, it is unnecessary to reestablish the communication path for the supervisory control unlike the conventional method, resulting in the significantly enhanced reliability of the system 1.

Moreover, in the above-mentioned embodiment, the information inserted in the space area of the overhead 10 has been described by way of the D1 to D3 bytes for the DCC, and the OH information from the other companies' networks 160A, 160B as examples. However, it must be noted that the present invention should not be limited to this, and information other than those in the above discussion may be inserted as long as the information is used in a system in accordance with, at least, the SONET (SDH transmission mode).

Further, the ATM communication is carried out by inserting the ATM cell in the space area of the overhead 10 in the above-mentioned embodiment. However, it is to be noted that the present invention should not be limited to this, and another type of communication can be carried out by inserting another data as long as, at least, destination information can be set in the data.

In addition, it is to be understood that the present invention should not be limited to the respective embodiments described above, and changes and variations may be made without departing from the spirit or scope of the present invention.

What is claimed is:

1. An SDH transmission system including a plurality of SDH transmission nodes, the SDH transmission system further comprising:
    a regenerator section for a communication between adjacent nodes;
    a multiplexer section for a communication between adjacent line terminating nodes; and
    a network section for a desired communication between any nodes in the network, wherein asynchronous communication is achieved by using unused overhead portion of the transmission frame to carry asynchronous transfer mode (ATM) cells.

2. An SDH transmission system according to claim 1, wherein asynchronous communication is achieved by using unused overhead bytes in multiplexer section overhead.

3. An SDH transmission system according to claim 2, wherein an ATM cell having a communication control information portion and a communication data portion is inserted in the unused overhead portion of the transmission frame, and
    an SDH transmission node being provided with an asynchronous communication control portion capable of transmitting the ATM cell to an additional SDH transmission node designated in destination information in the communication control information portion of the ATM cell.

4. An SDH transmission system according to claim 3, wherein the communication control information portion of the ATM cell includes at least identification information of an SDH transmission node serving as a transmission destination of the ATM cell.

5. An SDH transmission system according to claim 3, wherein the communication control information portion of the ATM cell includes both identification information of an SDH transmission node serving as a transmission destination of the ATM cell, and identification information of an SDH transmission node serving as a source of the ATM cell.

6. An SDH transmission system according to claim 5, wherein the SDH transmission node discards a received ATM cell when the communication control information portion of the received ATM cell contains identification information of the received ATM cell as identification information of an SDH transmission node serving as a source of the received ATM cell.

7. An SDH transmission system according to claim 3, wherein the SDH transmission nodes are connected in a ring manner to form a ring network as the network, and two communication routes are set in the network control section; and
    the communication control information portion of the ATM cell includes identification information of the SDH transmission node serving as a transmission destination of the ATM cell, identification information of the SDH transmission node serving as a source of the ATM cell, and flag information used to identify through which of the respective communication routes the ATM cell is transmitted.

8. An SDH transmission system according to claim 7, wherein the SDH transmission node discards a received ATM cell when the communication control information portion of the received ATM cell contains identification information of the received ATM cell as identification information of an SDH transmission node serving as a source of the received ATM cell.

9. An SDH transmission system according to claim 3, wherein the asynchronous communication control portion of an SDH transmission node for multiplex relay can transmit a received ATM cell to another network.

10. An SDH transmission system according to claim 1, wherein asynchronous communication is achieved by using unused bytes in regenerator section overhead.

11. An SDH transmission system according to claim 10, wherein an ATM cell having a communication control information portion and a communication data portion is inserted in the unused overhead portion of the transmission frame, and
    an SDH transmission node being provided with an asynchronous communication control portion capable of transmitting the ATM cell to an additional SDH transmission node designated in destination information in the communication control information portion of the ATM cell.

12. An SDH transmission system according to claim 11, wherein the communication control information portion of the ATM cell includes at least identification information of an SDH transmission node serving as a transmission destination of the ATM cell.

13. An SDH transmission system according to claim 11, wherein the communication control information portion of the ATM cell includes both identification information of an SDH transmission node serving as a transmission destination of the ATM cell, and identification information of an SDH transmission node serving as a source of the ATM cell.

14. An SDH transmission system according to claim 13, wherein the SDH transmission node discards a received ATM cell when the communication control information portion of the received ATM cell contains identification information of the received ATM cell as identification information of an SDH transmission node serving as a source of the received ATM cell.

15. An SDH transmission system according to claim 11 wherein the SDH transmission nodes are connected in a ring manner to form a ring network as the network, and two communication routes are set in the network control section; and
    the communication control information portion of the ATM cell includes identification information of an SDH transmission node serving as a transmission destination of the ATM cell, identification information of an SDH transmission node serving as a source of the ATM cell, and flag information used to identify through which of the respective communication routes the ATM cell is transmitted.

16. An SDH transmission system according to claim 15, wherein the SDH transmission node discards a received ATM cell when the communication control information portion of the received ATM cell contains identification information of the received ATM cell as identification information of an SDH transmission node serving as a source of the received ATM cell.

17. An SDH transmission system according to claim 11, wherein the asynchronous communication control portion of an SDH transmission node for multiplex relay can transmit a received ATM cell to another network.

18. An SDH transmission system according to claim 1, wherein an ATM cell having a communication control information portion and a communication data portion is inserted in the unused overhead portion of the transmission frame, and an SDH transmission node being provided with an asynchronous communication control portion capable of transmitting the ATM cell to an additional SDH transmission node designated in destination information in the communication control information portion of the ATM cell.

19. An SDH transmission system according to claim 18, wherein the communication control information portion of the ATM cell includes at least identification information of an SDH transmission node serving as a transmission destination of the ATM cell.

20. An SDH transmission system according to claim 18, wherein the communication control information portion of the ATM cell includes both identification information of an SDH transmission node serving as a transmission destination of the ATM cell, and identification information of an SDH transmission node serving as a source of the ATM cell.

21. An SDH transmission system according to claim 20, wherein the SDH transmission node discards a received ATM cell when the communication control information portion of the received ATM cell contains identification information of the received ATM cell as identification information of an SDH transmission node serving as a source of the received ATM cell.

22. An SDH transmission system according to claims 18, wherein the SDH transmission nodes are connected in a ring manner to form a ring network as the network, and two communication routes are set in the network control section; and the communication control information portion of the ATM cell includes identification information of an SDH transmission node serving as a transmission destination of the ATM cell, identification information of an SDH transmission node serving as a source of the ATM cell, and flag information used to identify through which of the respective communication routes the ATM cell is transmitted.

23. An SDH transmission system according to claim 22, wherein the SDH transmission node discards a received ATM cell when the communication control information portion of the received ATM cell contains identification information of the received ATM cell as identification information of an SDH transmission node serving as a source of the received ATM cell.

24. An SDH transmission system according to claim 18, wherein the asynchronous communication control portion of an SDH transmission node for multiplex relay can transmit a received ATM cell to another network.

25. An SDH transmission system according to claim 1, wherein the communication in the network control section is made redundant.

26. An SDH transmission system according to claim 25, wherein two communication routes are set in the network control section to carry out a communication by using, when one of the communication routes becomes unavailable, the other communication route.

27. An SDH transmission system according to claim 26, wherein the SDH transmission nodes are connected in a ring manner to form a ring network as the network, and communication routes respectively extending to the right and the left with respect to the ring network being set as the two communication routes in the network control section of the ring network.

28. An SDH transmission system according to claim 27, wherein any one of the communication routes respectively extending to the right and the left is previously set to an unavailable state. asynchronous communication is achieved by using unused overhead portion of the transmission frame.

29. An SDH transmission system according to claim 28, wherein, when the communication route different from the communication route set to the unavailable state becomes unavailable, the communication route set to the unavailable state is set to an available state.

30. In an SDH transmission system to transmit a transmission frame in an SDH transmission mode, a frame transmission method in the SDH transmission mode comprising the steps of:

inserting an asynchronous transfer mode (ATM) cell into used bytes in an overhead portion of the transmission frame; and transmitting the transmission frame.

31. An SDH transmission unit to transmit a transmission frame used in an SDH transmission system, the SDH transmission unit comprising:

a first overhead information extracting portion to extract an asynchronous transfer mode (ATM) cell inserted in an unused area of an overhead of a received frame;

a second overhead information extracting portion to extract standardized information;

a node control portion to perform communication processing for a supervisory control about the SDH transmission system depending upon the standardized information;

an overhead inserting portion to insert a result of processing in the node control portion as an overhead of a transmission frame; and a select control portion to select the ATM cell inserted in an unused area of an overhead of a received frame to be terminated at the node control portion or to be transmitted to another node using said overhead inserting portion.

32. An SDH transmission unit according to claim 31, wherein the first overhead information extracting portion is configured as an ATM cell extracting portion to extract an ATM cell having a communication control information portion and a communication data portion; and a distribution control portion is configured as an asynchronous communication control portion to perform the distribution processing depending upon communication control information set in the communication control information portion of the ATM cell.

33. An SDH transmission unit according to claim 32, wherein the asynchronous communication control portion comprises:

a switching mechanism portion to output, when communication control information set in the communication control information portion of the received ATM cell is self-addressed information, the ATM cell to the main communication control portion, and to output, when the communication control information set in the communication control information portion of the received ATM cell is information other than the self-addressed information, the ATM cell to the overhead inserting portion.

34. An SDH transmission system according to claim 33, wherein the switching mechanism portion transmits the ATM cell to an SDH transmission node in an additional SDH transmission system when the communication control information portion of the ATM cell includes transmission instruction information showing as a destination the SDH transmission node in the additional SDH transmission system.

35. An SDH transmission unit according to claim 33, wherein the asynchronous communication control portion comprises:
an asynchronous communication cell generating portion to generate an ATM cell addressed to an additional SDH transmission node, and the switching mechanism portion outputting to the overhead inserting portion the ATM cell generated in the asynchronous communication cell generating portion so as to insert into unused bytes in the overhead portion for the additional SDH transmission node.

36. An SDH transmission unit according to claim 35, wherein the asynchronous communication cell generating portion sets in the communication control information portion of the ATM cell identification information of the additional SDH transmission node serving as a transmission destination of the ATM cell.

37. An SDH transmission unit according to claim 35, wherein the asynchronous communication cell generating portion sets in the communication control information portion of the ATM cell both identification information of the additional SDH transmission node serving as a transmission destination of the ATM cell, and identification information of the ATM cell.

38. An SDH transmission system according to claim 37, wherein the switching mechanism portion discards the ATM cell, when identification information set in the communication control information portion of an ATM cell received from an additional SDH transmission node is identification of the ATM cell received from the additional SDH transmission node.

39. An SDH transmission system according to claim 35, wherein the switching mechanism portion transmits the ATM cell to an SDH transmission node in an additional SDH transmission system when the communication control information portion of the ATM cell includes transmission instruction information showing as a destination the SDH transmission node in the additional SDH transmission system.

* * * * *